(12) United States Patent
Hara

(10) Patent No.: US 8,712,687 B2
(45) Date of Patent: Apr. 29, 2014

(54) DETERMINING SYSTEM FOR LOCALIZATION METHODS COMBINATION

(75) Inventor: Yoshitaka Hara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 427 days.

(21) Appl. No.: 12/868,128

(22) Filed: Aug. 25, 2010

(65) Prior Publication Data

US 2011/0066303 A1    Mar. 17, 2011

(30) Foreign Application Priority Data

Sep. 16, 2009    (JP) .................. 2009-214030

(51) Int. Cl.
*G01C 22/00*    (2006.01)
*G05D 1/00*    (2006.01)
*G01C 21/00*    (2006.01)
*G01S 1/00*    (2006.01)
*G01S 5/02*    (2010.01)

(52) U.S. Cl.
USPC ............... 701/483; 701/23; 701/25; 701/468; 701/469; 701/518; 701/534

(58) Field of Classification Search
USPC ............. 701/23–28, 468, 469, 472, 475, 494, 701/495, 500, 501, 483, 700, 901, 473, 518, 701/534; 901/1; 700/245–257
See application file for complete search history.

(56) References Cited

U.S. PATENT DOCUMENTS

| | | | | |
|---|---|---|---|---|
| 4,806,940 | A * | 2/1989 | Harral et al. | 342/451 |
| 5,751,576 | A * | 5/1998 | Monson | 700/83 |
| 6,047,236 | A * | 4/2000 | Hancock et al. | 701/409 |
| 2006/0271295 | A1 * | 11/2006 | McLaren et al. | 701/216 |

FOREIGN PATENT DOCUMENTS

| | | | | |
|---|---|---|---|---|
| JP | 2002-31528 | A | | 1/2002 |
| JP | 2003-161622 | A * | 6/2003 | ............ G01C 21/00 |
| JP | 2004-163424 | A | | 6/2004 |
| JP | 2004-219332 | A | | 8/2004 |
| JP | 2007-198760 | A | | 8/2007 |
| JP | 2008-204458 | A | | 9/2008 |
| JP | 2009-14643 | A | | 1/2009 |

OTHER PUBLICATIONS

K. Kanai et al., "Vehicle", Corona Publishing Co., Ltd., Tokyo, Japan, pp. 142-173, 2003.
S. Thrun et al., "Probabilistic Robotics", MIT Press, Cambridge, MA, pp. 121-166, 2005.

* cited by examiner

*Primary Examiner* — Ryan Zeender
*Assistant Examiner* — Allen Chein
(74) *Attorney, Agent, or Firm* — Mattingly & Malur, PC

(57) ABSTRACT

A determining system for localization methods combination which determines a combination of a plurality of localization methods used in a vehicle includes: a unit that stores therein a localization accuracy influence parameter which is determined for each position in a travel environment; a unit that stores therein a relation between the localization accuracy influence parameter and a localization accuracy of each of a plurality of the localization methods; a unit that stores therein correspondence information between the localization accuracy influence parameter and each of the localization methods; a unit that acquires the localization accuracy influence parameter in the travel environment; and a unit that acquires the correspondence information on the localization accuracy influence parameter, references the relation based on the correspondence information, and thereby predicts a localization accuracy of each of the localization methods at each position in the travel environment.

8 Claims, 17 Drawing Sheets

Localization accuracy database
102b(102)

| Localization accuracy influence parameter | Localization accuracy (Localization error [m]) |
|---|---|
| 0 | 10.0 |
| 10 | 1.0 |
| 20 | 0.5 |
| ⋮ | ⋮ |
| 100 | 0.1 |

FIG. 16

Correspondence information table
103

| NO. | Landmark Used | Sensing Method | Localization Accuracy Influence Parameter | Localization Accuracy Influence Parameter–Localization Accuracy Relational Expression |
|---|---|---|---|---|
| 1 | GPS satellites | Point positioning | Canopy openness | Database error × 1 |
| 2 | GPS satellites | Differential positioning | Canopy openness | Database error × 0.7 |
| 3 | Tree landmark | Laser scanner | Tree landmark interval distance | Database error × 1 |
| 4 | Tree landmark | Stereo camera | Tree landmark interval distance | Database error + 0.5[m] |
| 5 | Utility pole landmark | Laser scanner | Utility pole landmark interval distance | Database error × 1 |
| 6 | Utility pole landmark | Stereo camera | Utility pole landmark interval distance | Database error + 0.5[m] |
| 7 | Building wall landmark | Laser scanner | Building wall landmark interval distance | Database error × 1 |
| 8 | Building wall landmark | Stereo camera | Building wall landmark interval distance | Database error + 0.5[m] |
| ... | ... | ... | ... | ... |

DETERMINING SYSTEM FOR LOCALIZATION METHODS COMBINATION

CROSS REFERENCE TO RELATED APPLICATIONS

This application claims the benefit of Japanese Patent Application No. 2009-214030 filed on Sep. 16, 2009, the disclosure of which is incorporated herein by reference.

BACKGROUND OF THE INVENTION

1. Field of the Invention

The present invention relates to a technique in which a localization is performed in a vehicle such as an autonomous mobile vehicle or a logistics support robot using a combination of a plurality of localization methods.

2. Description of the Related Art

It has been known that a combination of a plurality of localization methods such as GPS (Global Positioning System) and various landmarks is effective for performing a localization, that is, a self-position estimation, with high accuracy and improved reliability in a vehicle (a movable body with or without a human or an object mounted thereon) such as an automobile or a robot, as disclosed in Japanese Laid-Open Patent Application, Publication No. 2004-219332, "Vehicle, p142-p173 (K. Kanai et al; Corona Publishing Co., Ltd. (2003))", and "Probabilistic Robotics, p121-p166 (S. Thrun, W. Burgard, and D. Fox; MIT Press (2005))". In performing the localization, it has also been known that effective localization methods are different according to target travel environments, and thus, a combination of localization methods suitable for a given travel environment has to be determined in some appropriate way.

Japanese Laid-Open Patent Application, Publication No. 2004-163424 discloses a technique in which, in performing a localization not using a combination of localization methods but using GPS alone, a localization accuracy in a target travel environment is simulated.

Note that the above-mentioned localization using various landmarks means a localization using, as a reference, a stationary body which is available as a marker (that is, a landmark) present in a travel environment and whose position has already been known, such as a tree, a utility pole, and a building wall. The localization using GPS is, in other words, a localization using GPS satellites as landmarks.

There has been a problem of how a suitable combination of localization methods in a travel environment can be selected. The above-mentioned related art documents describe in detail a technique of a position estimation in a case where a suitable combination of localization methods is previously known. However, the related art documents do not disclose how to determine a suitable localization method combination. Further, the related art documents do describe a technique which enables a localization accuracy prediction if GPS is used, but do not disclose a technique which realizes a localization accuracy prediction if a combination of a plurality of localization methods is used.

A determining system for localization methods combination according to the related art is usually performed as follows. A tentative combination of localization methods is determined. The determining system of the tentative combination is mounted on a vehicle. A test using the vehicle and other actual equipment is conducted in a target travel environment. A localization accuracy of the tentatively-determined combination of localization methods cannot be evaluated until completion of the test. If the localization accuracy of the combination subjected to the test cannot achieve a target localization accuracy, it is necessary to start such a process again from determining another tentative combination of localization methods. This presents a problem that it takes much time and cost.

In light of the problems as described above, the present invention has been made in an attempt to determine a combination of localization methods which can achieve a target localization accuracy at low cost.

If a localization accuracy of each localization method in a target travel environment is previously predictable, a suitable combination of localization methods which can achieve a target localization accuracy at low cost can be determined without conducting a test using actual equipment. However, a localization accuracy of a localization method varies according to travel environments, which makes it difficult to know the localization accuracy in advance. In the related art, the localization accuracy is known only after a vehicle with the localization methods mounted thereon is built and actually performs a localization in the travel environment. The present invention is in an attempt to solve the problems based on the following findings obtained by the present inventors.

According to the findings of the present inventors, a localization accuracy of a localization method depends on a layout of landmarks used by the localization method or a landmark position detection accuracy, which can be represented as a numerical parameter. The parameter can be examined even without conducting any localization using actual equipment. Further, a relation between the parameter and the localization accuracy of the localization method can be maintained to build a database. By referencing the database, the localization accuracy of the localization method in the target travel environment can be predicted without conducting an actual localization. Consequently, based on the predicted localization accuracy of the localization method, a combination of localization methods suitable for achieving a target localization accuracy can be determined.

SUMMARY OF THE INVENTION

A determining system for localization methods combination which determines a combination of a plurality of localization methods used in a vehicle includes: a storage unit of localization accuracy influence parameter map that stores therein a localization accuracy influence parameter which is determined for each position in a travel environment; a storage unit of localization accuracy database that stores therein a relation between the localization accuracy influence parameter and a localization accuracy of each of a plurality of the localization methods; and a storage unit of correspondences between localization method and localization accuracy influence parameter that stores therein correspondence information between the localization accuracy influence parameter and each of the localization methods. The determining system for localization methods combination further includes: an acquisition unit for localization accuracy influence parameter that acquires the localization accuracy influence parameter in the travel environment from the storage unit of localization accuracy influence parameter map; and a prediction unit for localization accuracy that acquires the correspondence information on the localization accuracy influence parameter acquired from the acquisition unit for localization accuracy influence parameter, from the storage unit of correspondences between localization method and localization accuracy influence parameter, references the storage unit of localization accuracy database based on the correspondence information, and thereby predicts a localization accuracy of each of the localization methods at each position in the travel environment. The prediction unit for localization accuracy predicts a localization accuracy of a combination of the plural localization methods.

Other features and advantages of the present invention will become more apparent from the following detailed description of the invention, when taken in conjunction with the accompanying exemplary drawings.

BRIEF DESCRIPTION OF THE DRAWINGS

FIG. 16 is a diagram illustrating contents of correspondence information between a localization method and a localization accuracy influence parameter according to the embodiment.

DETAILED DESCRIPTION OF THE EXEMPLARY EMBODIMENT

An embodiment of the present invention is described below in detail with reference to the accompanying drawings.

Figure 1:
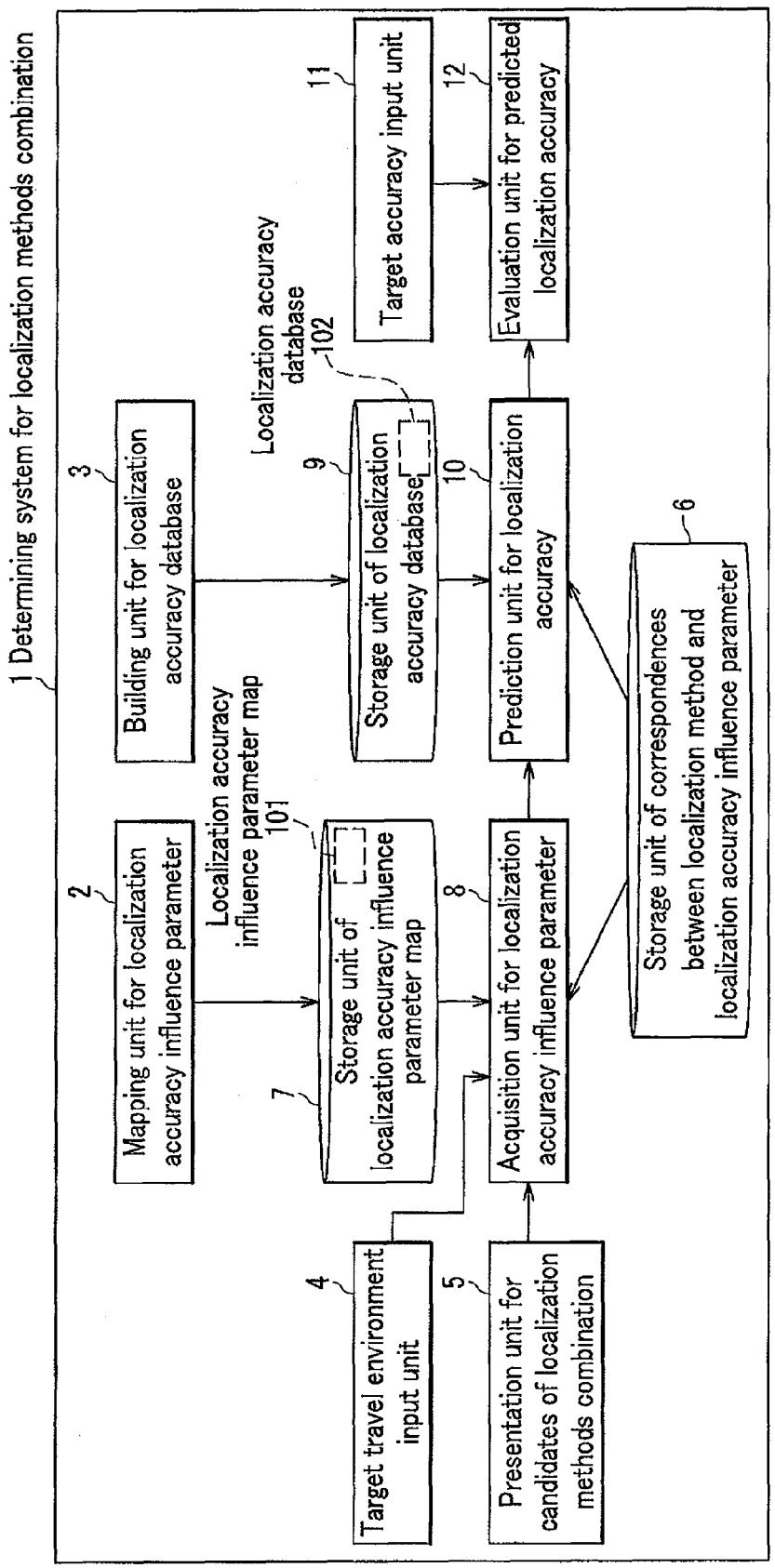
FIG. 1 is a block diagram illustrating a configuration of a determining system of a combination of a plurality of localization methods according to an embodiment of the present invention.

Next is described a configuration of a determining system for localization methods combination in an embodiment of the present invention with reference to FIG. 1.

<Configuration>

A determining system for localization methods combination 1 includes a mapping unit for localization accuracy influence parameter 2, a creating unit for localization accuracy database 3, a target travel environment input unit 4, a presentation unit for candidates of localization methods combination 5, a storage unit of correspondences between localization method and localization accuracy influence parameter 6, a storage unit of localization accuracy influence parameter map 7, an acquisition unit for localization accuracy influence parameter 8, a storage unit of localization accuracy database 9, a prediction unit for localization accuracy 10, a target accuracy input unit 11, and an evaluation unit for predicted localization accuracy 12.

The determining system for localization methods combination 1 has hardware resources such as an input device (for example, a keyboard and a sensor), an output device (for example, a display), a control device (for example, a CPU (Central Processing Unit), an LSI (Large Scale Integration)), and a storage device (for example, a ROM (Read Only Memory), a RAM (Random Access Memory), and/or an HDD (Hard Disk Drive)) and is configured by one or more computers. The above-described units (including other units to be described hereinafter) realize functions of the determining system for localization methods combination 1 and execute desired information processing by coordinating with the hardware resources. If the determining system for localization methods combination 1 is configured by two or more computers, each of the computers can have a part (or all, in some cases) of the above-described units. Such computers can be incorporated in a vehicle.

Next are described functions of each of the constituting units.

The mapping unit for localization accuracy influence parameter 2 creates a localization accuracy influence parameter map 101 which is to be stored in the storage unit of localization accuracy influence parameter map 7. The localization accuracy influence parameter map 101 used herein is map data created by including a localization accuracy influence parameter in map data read from an external device (for example, a communicably connected device) in a prescribed way. The localization accuracy influence parameter is a parameter of a travel environment which influences localization accuracy of each localization method and is obtained as a numerical value by observing the environment, details of which will be described hereinafter.

The creating unit for localization accuracy database 3 creates a localization accuracy database 102 which is to be stored in the storage unit of localization accuracy database 9, details of which will be described hereinafter with reference to FIG. 17.

The target travel environment input unit 4 is a unit to which a user inputs a target travel environment. For example, the target travel environment input unit 4 displays a map to the user using, for example, a display screen on which the user enters at least either a range or a route of the user's target travel environment, using an input device such as a touch screen not shown. Such functions of the target travel environment input unit 4 are realized by a known technique used in a car navigation system or the like.

The presentation unit for candidates of localization methods combination 5 presents a combination candidate of localization methods using GPS, various landmarks such as a tree, a utility pole, and a building wall, and the like. The presentation unit for candidates of localization methods combination 5: stores therein (for example, in a storage part thereof, not shown) items of all available localization methods; calculates all possible localization method combinations from the stored items using mathematical combination; and presents the calculated combinations to the user as localization method candidate combinations. Also, if the user selects a localization method combination candidate from the presented localization method candidate combinations, the presentation unit for candidates of localization methods combination 5 inputs the selected localization method combination candidate into the acquisition unit for localization accuracy influence parameter 8. The presentation of the localization method candidate combinations to the user is performed by using an output device such as a display screen. The selection of the localization method combination candidate by the user is performed by using an input device such as a touch screen and a keyboard.

The storage unit of correspondences between localization method and localization accuracy influence parameter 6 stores therein information on correspondence between respective localization methods and localization accuracy influence parameters. That is, the storage unit of correspondences between localization method and localization accuracy influence parameter 6 stores therein: correspondence relations indicating which localization accuracy influence parameter influences which localization method; and a relational expression between a localization accuracy influence parameter and its localization accuracy, as the correspondence information, details of which is described in detail with reference to FIG. 16.

The storage unit of localization accuracy influence parameter map 7 stores therein the localization accuracy influence parameter map 101 created by the mapping unit for localization accuracy influence parameter 2. A data format of the localization accuracy influence parameter map 101 is described later with reference to FIG. 8 through FIG. 13.

The acquisition unit for localization accuracy influence parameter 8 acquires an item of a localization accuracy influence parameter corresponding to each localization method of the localization method combination candidate inputted from the presentation unit for candidates of localization methods combination 5, from the accuracy influence parameter correspondence storage unit 6. The acquisition unit for localization accuracy influence parameter 8 also acquires a value of the corresponding localization accuracy influence parameter under the target travel environment inputted from the target travel environment input unit 4, from the storage unit of localization accuracy influence parameter map 7.

The storage unit of localization accuracy database 9 stores therein the localization accuracy database 102 which is created by the creating unit for localization accuracy database 3 and stores therein the localization accuracy of each localization method for each localization accuracy influence parameter. Data formats of the localization accuracy database 102 will be described hereinafter with reference to FIG. 14 and FIG. 15.

The prediction unit for localization accuracy 10 references the localization accuracy database 102 stored in the storage unit of localization accuracy database 9, using the localization accuracy influence parameter which is inputted from the acquisition unit for localization accuracy influence parameter 8, and the relational expression between the localization accuracy influence parameter and the localization accuracy which is inputted from the storage unit of correspondences between localization method and localization accuracy influence parameter 6. The prediction unit for localization accuracy 10 thereby estimates a localization accuracy of the inputted localization method combination candidate.

The target accuracy input unit 11 is a unit into which the user inputs a target localization accuracy, using an input device such as a keyboard.

The evaluation unit for predicted localization accuracy 12 compares the localization accuracy of the localization method predicted by the prediction unit for localization accuracy 10, with the target localization accuracy acquired from the target accuracy input unit 11, to thereby evaluate whether or not the inputted localization method combination candidate can achieve the target localization accuracy. That is, the evaluation unit for predicted localization accuracy 12 evaluates whether or not the inputted localization method combination candidate is a suitable combination of localization methods for achieving the target localization accuracy.

Next is described a detailed definition of the localization accuracy influence parameter, with reference to FIG. 2 to FIG. 7.

Figure 2:
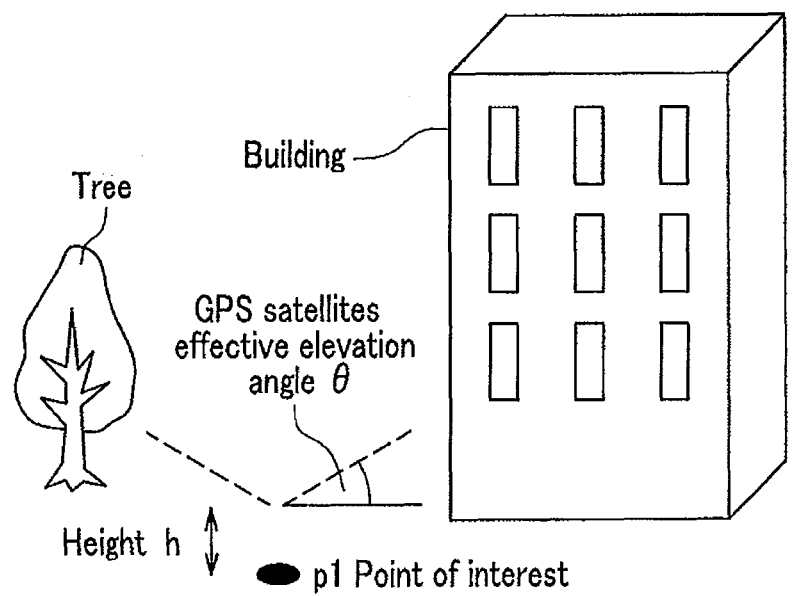
FIG. 2 is a diagram illustrating a localization accuracy influence parameter corresponding to a localization method using GPS according to the embodiment.
Figure 3:
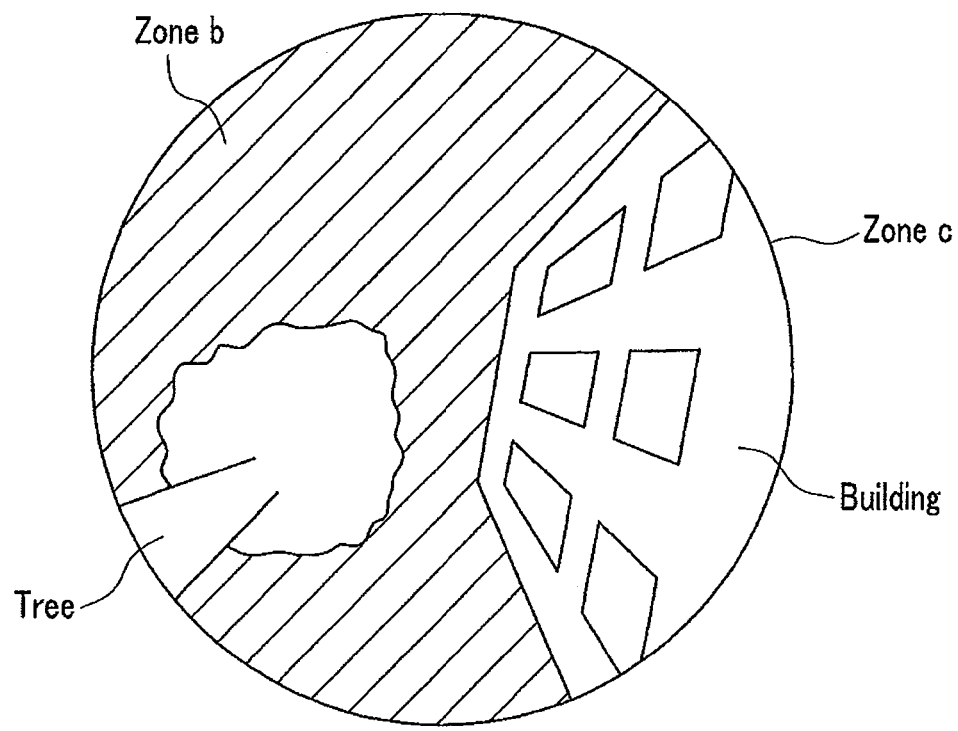
FIG. 3 is another diagram illustrating a localization accuracy influence parameter corresponding to a localization method using GPS according to the embodiment.

FIG. 2 and FIG. 3 each illustrate an example of a localization accuracy influence parameter corresponding to a localization method using GPS. The GPS localization is performed using radio signals from GPS satellites not shown. Thus, localization accuracy of the GPS largely depends on how easily the radio signals can be received from the GPS satellites, that is, whether or not there is an obstacle between a vehicle on the ground to be localized and the GPS satellites. A canopy openness "s" which is an extent of a viewable sky viewed from the ground is used as a localization accuracy influence parameter. More specifically, the canopy openness s is defined, at a point of interest p1 of FIG. 2, as a ratio of a dimension in which the sky is viewable, to a dimension covered by a GPS satellite effective elevation angle θ (for example, 10 degrees) or larger from a height h at which a GPS signal receiving antenna is installed in a vehicle (for example, 1 m). That is, if one looks up at the point of interest p1, as shown in FIG. 3, a circle shows a zone "c" which corresponds to an area having the GPS satellite effective elevation angle θ or larger. A hatched portion of the area c is a zone "b" in which the sky is viewable. Then the canopy openness s can be calculated as the localization accuracy influence parameter by dividing the area of the zone b by the area of the zone c. Note that the height h at which the GPS signal receiving antenna is installed in a vehicle is determined according to a type of the vehicle. The GPS satellite effective elevation angle θ is determined according to a setting of a GPS receiver to be used.

Figure 4:
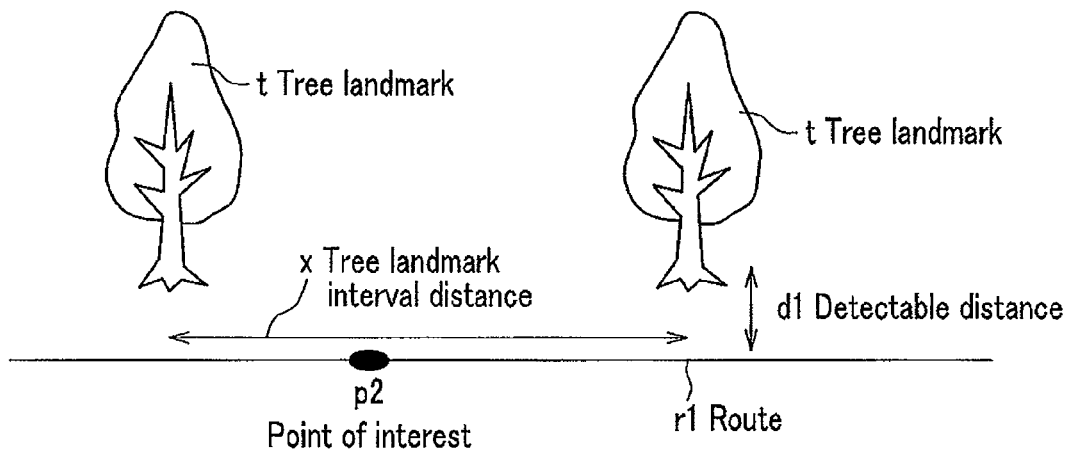
FIG. 4 is a diagram illustrating a localization accuracy influence parameter corresponding to a localization method using tree landmarks according to the embodiment.

FIG. 4 illustrates an example of a localization accuracy influence parameter corresponding to a localization method in which trees are used as landmarks. The localization method with a tree landmark "t" utilizes a tree whose location has already been known as a reference. The localization method is thus characterized by a high localization accuracy near the tree landmark t and a low localization accuracy without or away from the tree landmark t. The localization accuracy with the tree landmark t largely depends on a position of the tree landmark t in a target travel environment. Hence, an interval between two tree landmarks t, t is used herein as a localization accuracy influence parameter. More specifically, as shown in FIG. 4, a tree landmark interval distance x with respect to a point of interest p2 is used as the localization accuracy influence parameter. That is, two adjacent trees are detected each of which is positioned within a detectable distance d1 (for example, 20 m) from a route r1 on which the point of interest p2 exists and which are positioned with respect to each other across the point of interest p2. An interval between the two trees is the tree landmark interval distance x. A value of the detectable distance d1 used herein is a maximum measurement distance of a tree landmark t in the localization method. Any value of the detectable distance d1 can be set (via an input unit, for example,) according to the performance of the determining system for localization methods combination 1 or a target accuracy.

Figure 5:
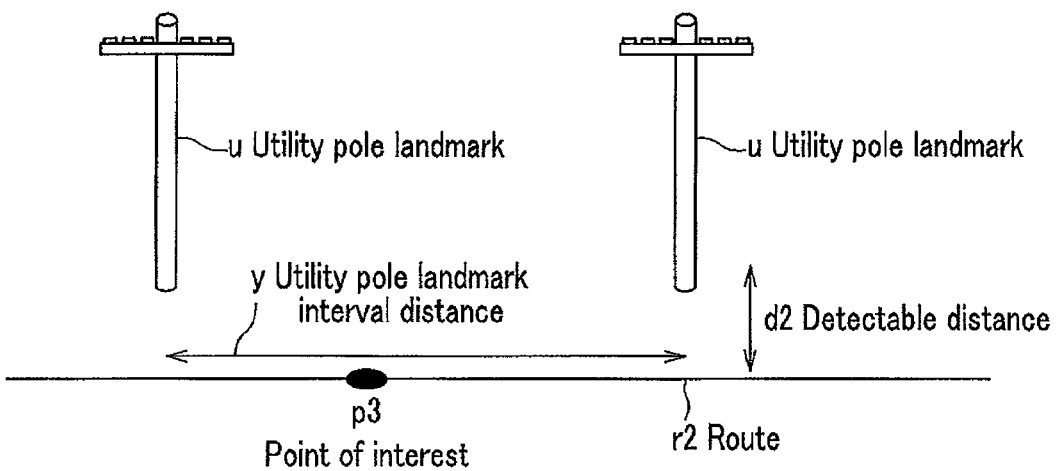
FIG. 5 is a diagram illustrating a localization accuracy influence parameter corresponding to a localization method using utility pole landmarks according to the embodiment.

Similarly, FIG. 5 illustrates an example of a localization accuracy influence parameter corresponding to a localization method in which utility poles are used as landmarks. As in the localization using a tree landmark t, the localization method with a utility pole landmark "u" utilizes a utility pole whose location has already been known as a reference. The localization method thus is characterized by a high localization accuracy near the utility pole landmark u and a low localization accuracy without or away from the utility pole landmark u. The localization accuracy with the utility pole landmark u largely depends on a position of the utility pole landmark u in a target travel environment. Hence, an interval between two utility pole landmarks u, u is used herein as a localization accuracy influence parameter. More specifically, as shown in FIG. 5, a utility pole landmark interval distance y with respect to a point of interest p3 is used as the localization accuracy influence parameter. That is, two utility poles are detected each of which is positioned within a detectable distance d2 (for example, 20 m) from a route r2 on which the point of interest p3 exists and which are positioned with respect to each other across the point of interest p3. An interval between the two utility poles is the utility pole landmark interval distance y. A value of the detectable distance d2 used herein is a maximum measurement distance of the utility pole landmark u in the localization method. Any value of the detectable distance d2 can be set (via an input unit, for example,) according to the performance of the determining system for localization methods combination 1 or a target accuracy.

In addition to tree landmarks t and utility pole landmarks u, street lights, road signs, traffic signals, or the like can be used as landmarks, and similarly define a localization accuracy influence parameter, though not used in this embodiment.

Figure 6:
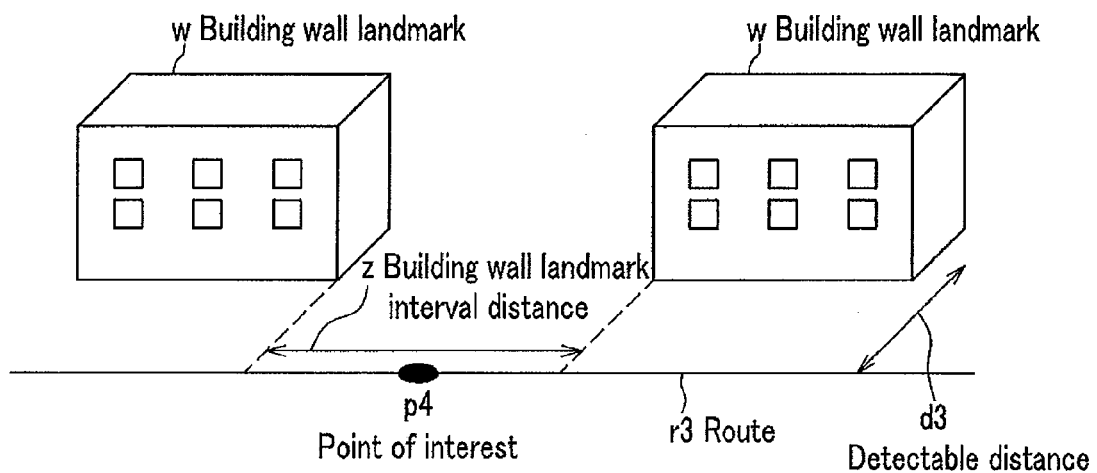
FIG. 6 is a diagram illustrating a localization accuracy influence parameter corresponding to a localization method using building wall landmarks according to the embodiment.
Figure 7:
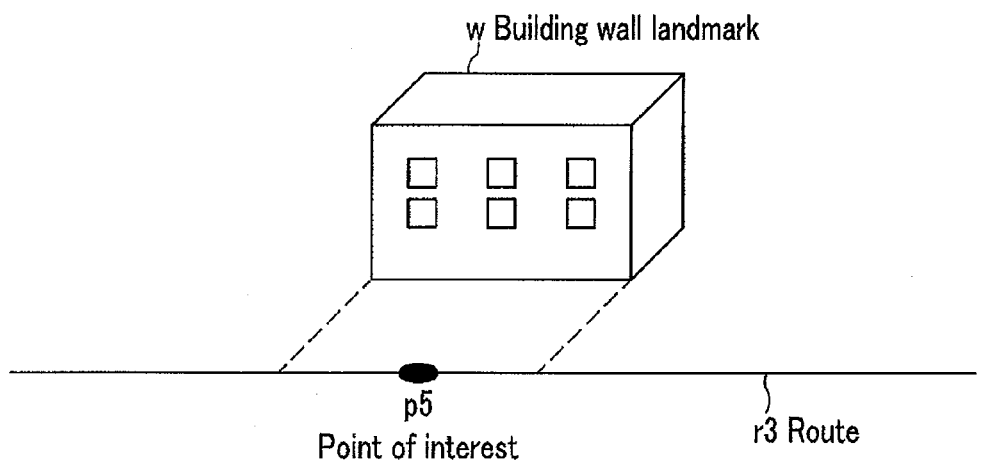
FIG. 7 is another diagram illustrating a localization accuracy influence parameter corresponding to a localization method using the building wall landmarks according to the embodiment.

FIG. 6 and FIG. 7 each illustrate an example of a localization accuracy influence parameter corresponding to a localization method in which a building walls are used as landmarks. The localization method with a building wall landmark "w" utilizes a building wall whose location has already been known as a reference. However, the building wall from a horizontal plane is viewed as a line segment, unlike a tree or a utility pole as a point. The building wall landmark w has thus characteristics a little different from those of the tree landmark t and the utility pole landmark u. Nevertheless, as with a tree landmark t and a utility pole landmark u, the localization method using the building wall landmark w is also characterized by a high localization accuracy near the building wall landmark w and a low localization accuracy without or away from the building wall landmark w. The localization accuracy with the building wall landmark w largely depends on a position of the building wall landmark w in a target travel environment. Hence, an interval between two building wall landmarks w, w is used herein as a localization accuracy influence parameter. More specifically, as shown in FIG. 6, a building wall landmark interval distance z with respect to a point of interest p4 is used as the localization accuracy influence parameter. That is, two building walls are detected each of which is positioned within a detectable distance d3 (for example, 25 m) from a route r3 on which the point of interest p4 exists and which are positioned with respect to each other across the point of interest p4. An interval between the two building walls is the building wall landmark interval distance z. A value of the detectable distance d3 used herein is a maximum measurement distance of the building wall landmark w in the localization method. Any value of the detectable distance d3 can be set (via an input unit, for example,) according to the performance of the determining system for localization methods combination 1 or a target accuracy. Note that, as shown in FIG. 7, if a point of interest p5 is positioned not between two buildings but alongside a building, the building wall landmark interval distance z is evaluated as "0".

Next is described a localization accuracy influence parameter map 101 which is created by the mapping unit for localization accuracy influence parameter 2 and is stored in the storage unit of localization accuracy influence parameter map 7.

As described above, the canopy openness s which is a localization accuracy influence parameter corresponding to the localization method using GPS takes different values from place to place. A target travel environment inputted from the target travel environment input unit 4 is gridded in 10-meter-square intervals, for example. The canopy openness s at each of the grid centers is evaluated and is stored in the localization accuracy influence parameter map 101. Alternatively, an average of canopy opennesses of four corners at each grid is stored in the map 101. Note that the size of the grid, that is, a grid interval "i" is not limited to 10 m and any other suitable size can be used. However, the grid interval i is preferably, but necessarily, not more than 10 times the size of a vehicle targeted by the determining system for localization methods combination 1 such as an autonomous mobile car or a logistics support robot. This is because a width of a route "r" on which the vehicle travels is roughly not more than 10 times the size of the vehicle. For example, according to Japan's Ministry of Land, Infrastructure and Transport, an automobile is about 2 meters wide, and a two-lane highway is about 20 meters wide. Hence, in order to represent the route r on which the vehicle travels, on the localization accuracy influence parameter map 101, the grid interval i is preferably not more than 10 times the size of the vehicle. For example, if the vehicle is 2 meters square, the grid interval i is preferably 20 meters or less.

Alternatively, a road on which a vehicle can run in a target travel environment is partitioned to create portions in each of which the canopy openness s to be stored is evaluated. For example, a road is equally partitioned at intervals of 10 meters, and the canopy openness s is evaluated at each center of the sections. The resultant canopy opennesses s are stored in the localization accuracy influence parameter map 101. Or, an average of the canopy opennesses of four corners at each section is stored in the map 101. Note that an interval of partitioning the road, that is, a section interval "e" is not limited to 10 meters and any other suitable interval can be used. However, the section interval e is preferably, but necessarily, not more than 10 times the size of a vehicle targeted by the determining system for localization methods combination 1 such as an autonomous mobile car or a logistics support robot. This is because a width of the route "r" on which the vehicle travels is roughly not more than 10 times the size of the vehicle. For example, according to Japan's Ministry of Land, Infrastructure and Transport, an automobile is about 2 meters wide, and a two-lane highway is about 20 meters wide. Hence, in order to represent the route r on which the vehicle travels, on the localization accuracy influence parameter map 101, the section interval e is preferably not more than 10 times the size of the vehicle. For example, if the vehicle is 2 meters long, the section interval e is preferably 20 meters or less.

Different sections between two landmarks have different values of the tree landmark interval distance x as the localization accuracy influence parameter corresponding to the localization method using tree landmarks t, the utility pole landmark interval distance y as the localization accuracy influence parameter corresponding to the localization method using utility pole landmarks u, and the building wall landmark interval distance z as the localization accuracy influence parameter corresponding to the localization method using building wall landmarks w. A road on which a vehicle can run is thus partitioned at each position at which a landmark is present. A localization accuracy influence parameter is calculated for each section. The calculated result is stored in the localization accuracy influence parameter map 101.

As described above, the localization accuracy influence parameter map 101 in which the corresponding localization accuracy influence parameters are stored is differently partitioned according to the localization method.

Next are described in detail data formats of the localization accuracy influence parameter map 101, that is, how to create sections and how to express a localization accuracy influence parameter, with reference to FIG. 8 to FIG. 13.

Figure 8:
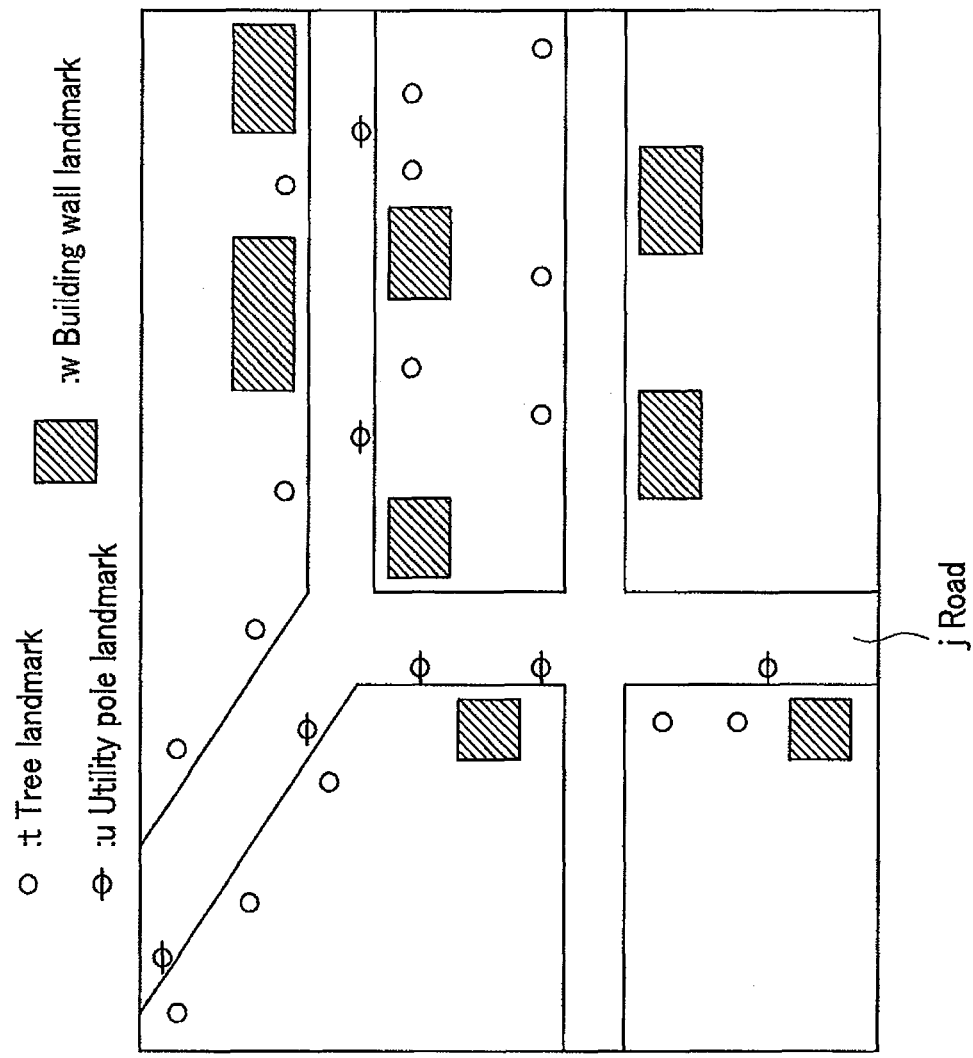
FIG. 8 is a map illustrating a target travel environment in plan view according to the embodiment.

FIG. 8 is a map illustrating a target travel environment in plan view inputted from the target travel environment input unit 4 and depicting a road "j" on which a vehicle can run. FIG. 8 also shows where tree landmarks t, utility pole landmarks u, and building wall landmarks w are situated. Taking this environment as an example, next are explained data formats of the localization accuracy influence parameter map 101 including different versions thereof.

Figure 9:
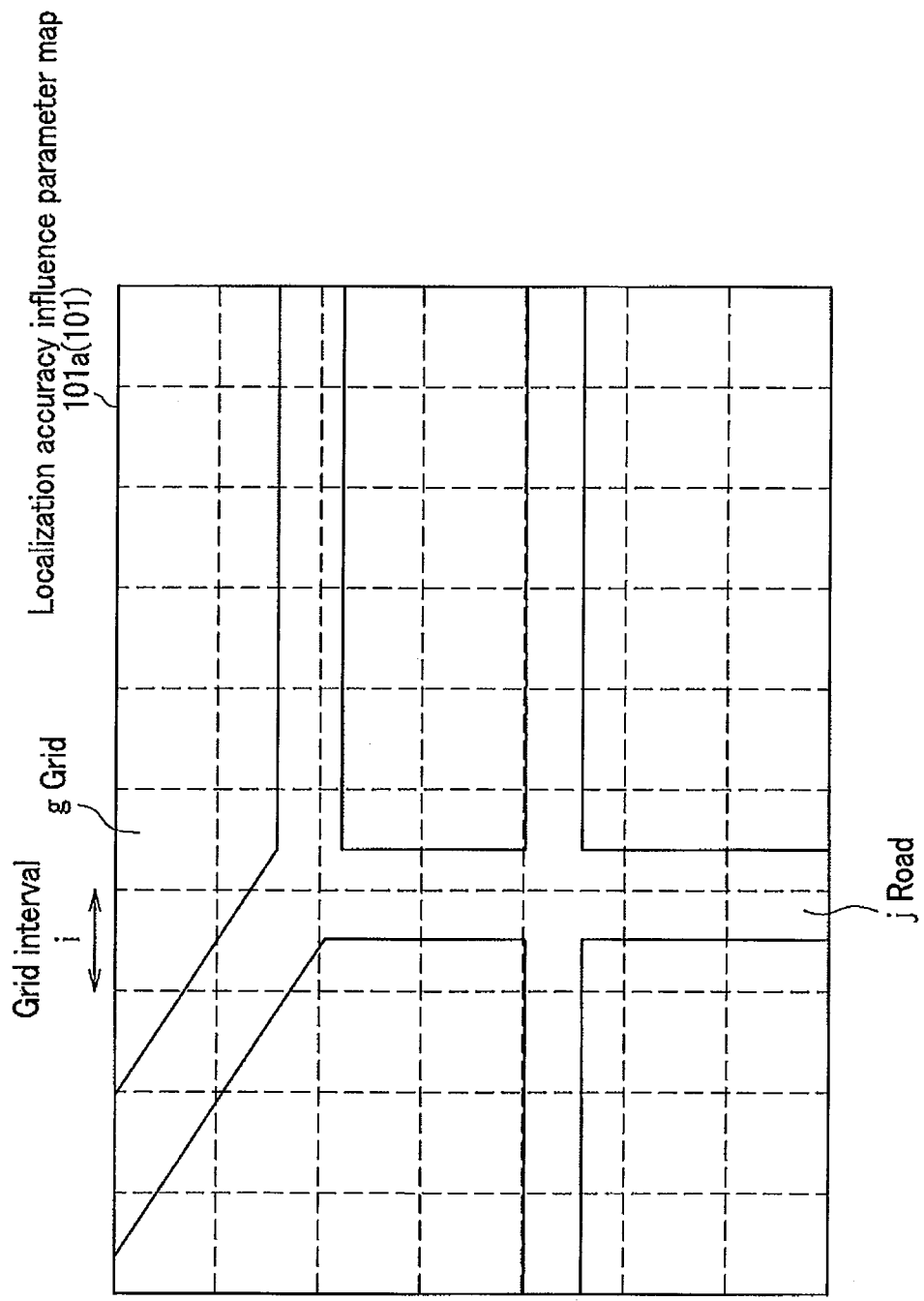
FIG. 9 is a diagram illustrating a localization accuracy influence parameter map having a data format in which a localization accuracy influence parameter using GPS is stored according to the embodiment.

FIG. 9 is a localization accuracy influence parameter map 101a (101) having a data format in which canopy openness s as the localization accuracy influence parameter corresponding to the GPS is stored (which may also be referred to as a first data format). The localization accuracy influence parameter map 101a which stores therein canopy openness s has a data format in which, as described above, a target travel environment is gridded by grids g in a grid interval i and stores therein the canopy opennesses s at the center of each grid g. Alternatively, the map 101a stores therein an average of the canopy opennesses of four corners at each grid g. Note that, the map 101a does not need to store therein the canopy openness s of a grid g within which the road j on which a vehicle can run is not included.

Figure 10:
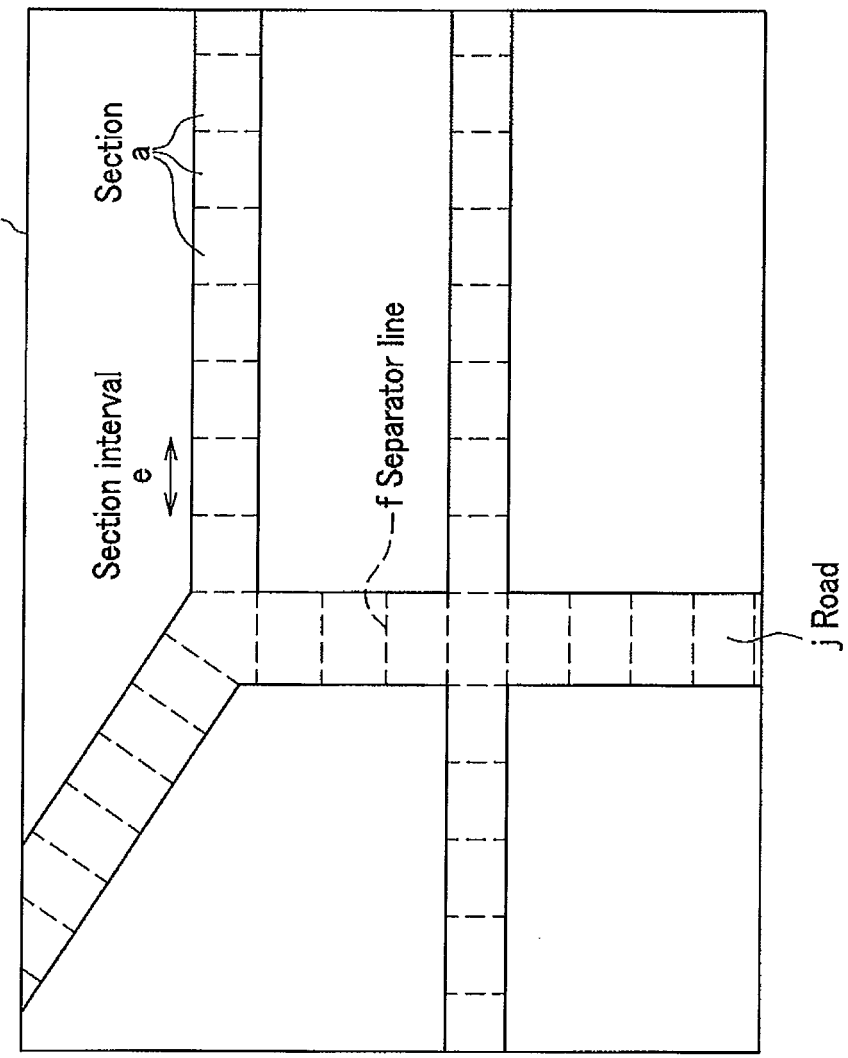
FIG. 10 is a diagram illustrating a localization accuracy influence parameter map having another data format in which a localization accuracy influence parameter using GPS is stored according to the embodiment.

FIG. 10 illustrates a localization accuracy influence parameter map 101b (101) having another data format in which canopy openness s is stored (which may also be referred to as a second data format). The localization accuracy influence parameter map 101b which stores therein the canopy openness s has a data format in which, as described above, the road j in a target travel environment is partitioned at section intervals e to create a section "a". A separator line f of the section a is assumed to be perpendicular to the road (a normal line). Each section a stores therein the canopy openness s at the center thereof. Alternatively, the each section a stores therein an average of the canopy opennesses s of four corners thereof.

Figure 11:
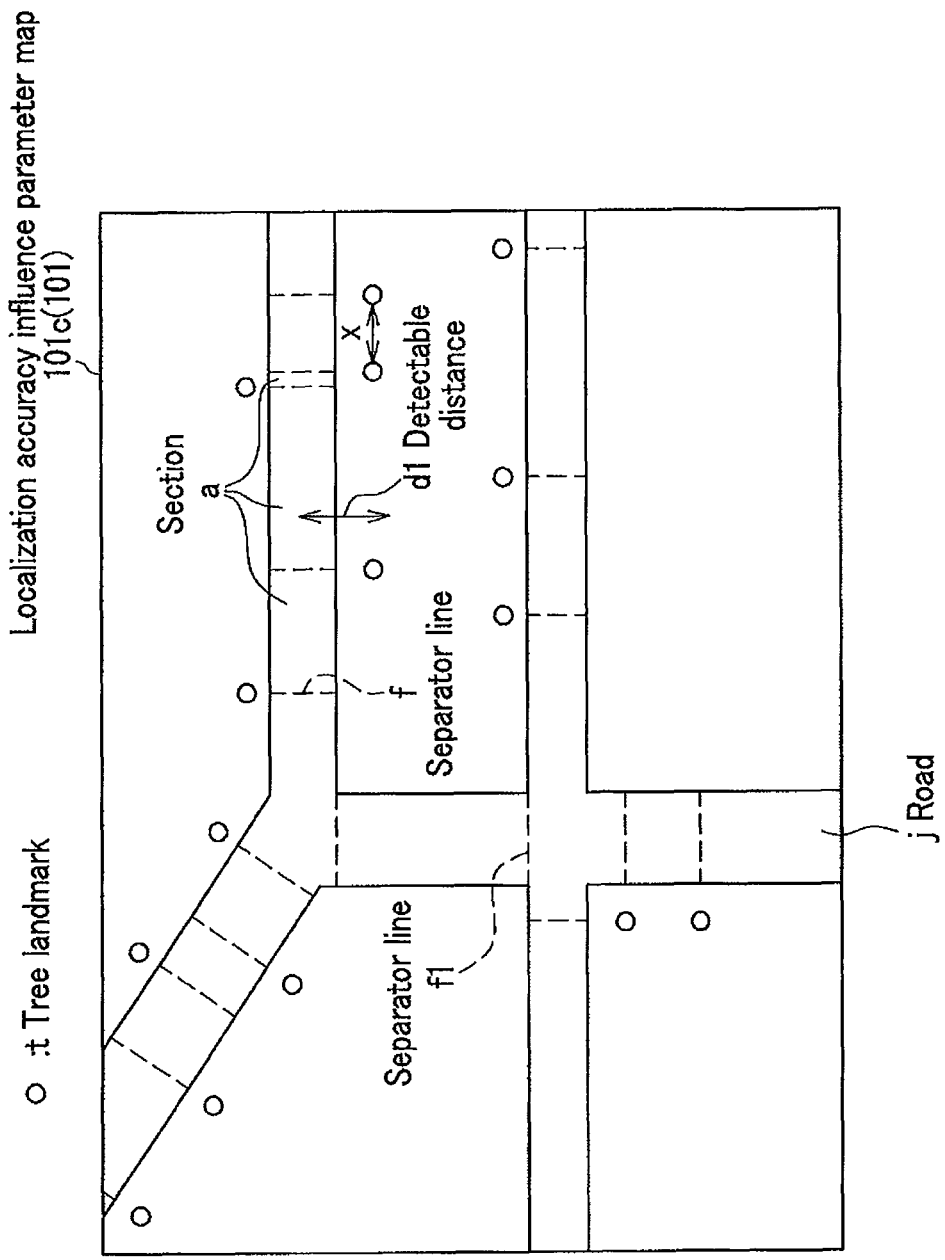
FIG. 11 is a diagram illustrating a localization accuracy influence parameter map having a data format in which a localization accuracy influence parameter using tree landmarks is stored according to the embodiment.

FIG. 11 illustrates a localization accuracy influence parameter map 101c (101) having a data format in which the tree landmark interval distance x is stored as the localization accuracy influence parameter corresponding to tree landmarks t (which may also be referred to as a third data format). The localization accuracy influence parameter map 101c which stores therein the tree landmark interval distance x has a data format in which, as described above, a data format in which a section a is created between two adjacent positions at each of which a tree landmark t is present. A section a is created only if a distance between the tree landmark t and the road j is within the detectable distance d1. A separator line f of a section a is assumed to be perpendicular to the road (a normal line). Each section a stores therein the tree landmark interval distance x which is measured based on two trees positioned with respect to each other across the section a. Note that, if there is no tree landmark t between one intersection and the next on the road j, the road j is partitioned at the intersections. See, for example, a separator line f1. Such a portion partitioned at intersections by separator lines does not have a tree landmark t, and the portion thus stores therein the tree landmark interval distance x of a value "−1" as an exceptional case. Note that the value is not limited to "−1". Any other value can be used as long as the value can be recognized as an exception value.

Figure 12:
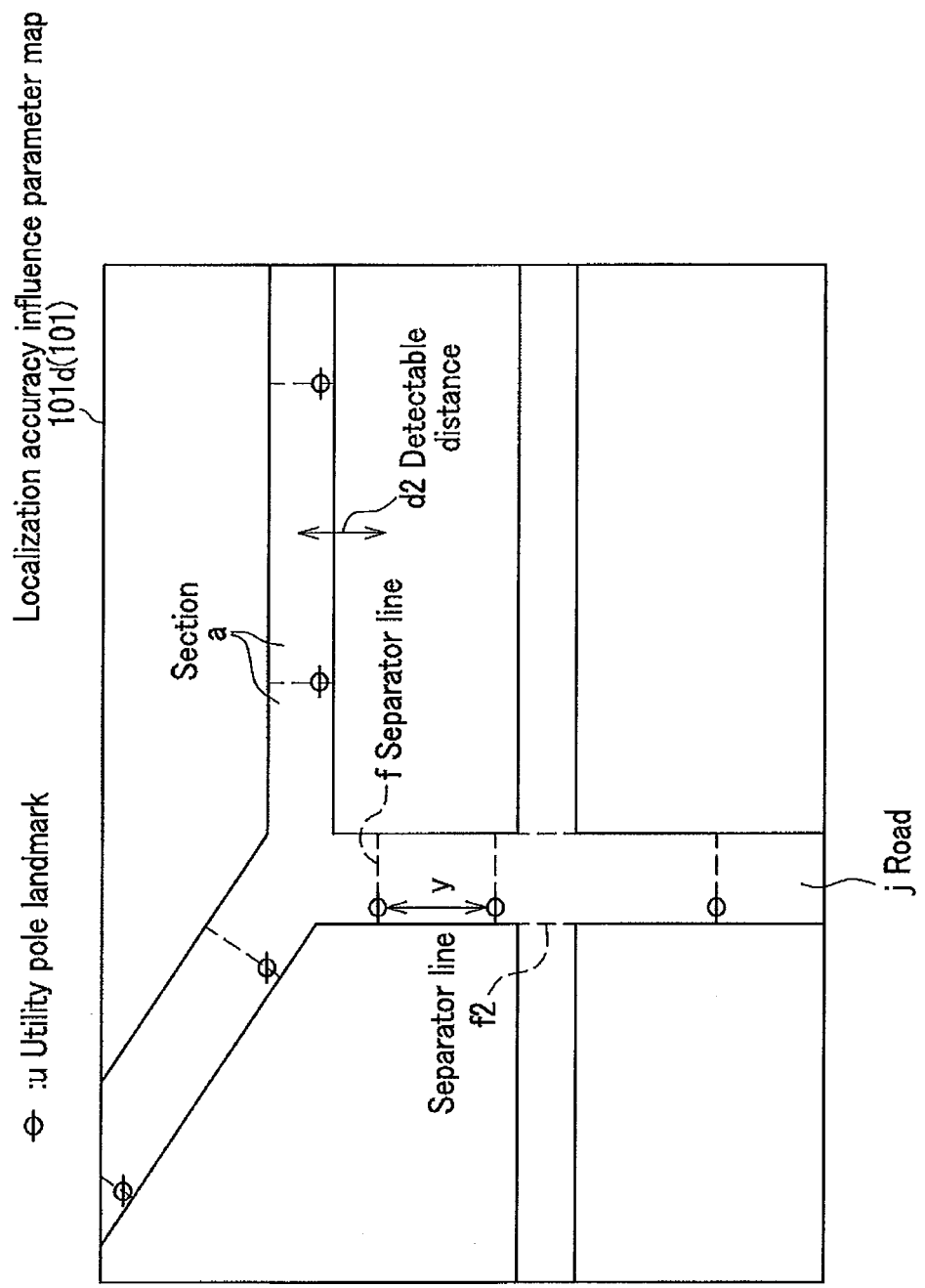
FIG. 12 is a diagram illustrating a localization accuracy influence parameter map having a data format in which a localization accuracy influence parameter using utility pole landmarks is stored according to the embodiment.

Similarly, FIG. 12 illustrates a localization accuracy influence parameter map 101d (101) having a data format in which the utility pole landmark interval distance y is stored as the localization accuracy influence parameter corresponding to utility pole landmarks u (which may also be referred to as another third data format). The localization accuracy influence parameter map 101d which stores therein the utility pole landmark interval distance y has a data format in which, as described above, a data format in which a section a is created between two adjacent positions at each of which a utility pole landmark u is present. The section is created only if a distance between a utility pole landmark u and the road j is within the detectable distance d2. A separator line f of the section a is assumed to be perpendicular to the road (a normal line). Each section a stores therein the utility pole landmark interval distance y which is measured based on two utility poles positioned with respect to each other across the section a. Note that, if there is no utility pole landmark u between one intersection and the next on the road j, the road j is partitioned at the intersections. See, for example, a separator line f2. Such a portion partitioned at intersections by separator lines does not have the utility pole landmark u, and the portion thus stores therein the utility pole landmark interval distance y of a value "−1" as an exceptional case. Note that the value is not limited to "−1". Any other value can be used as long as the value can be recognized as an exception value.

Figure 13:
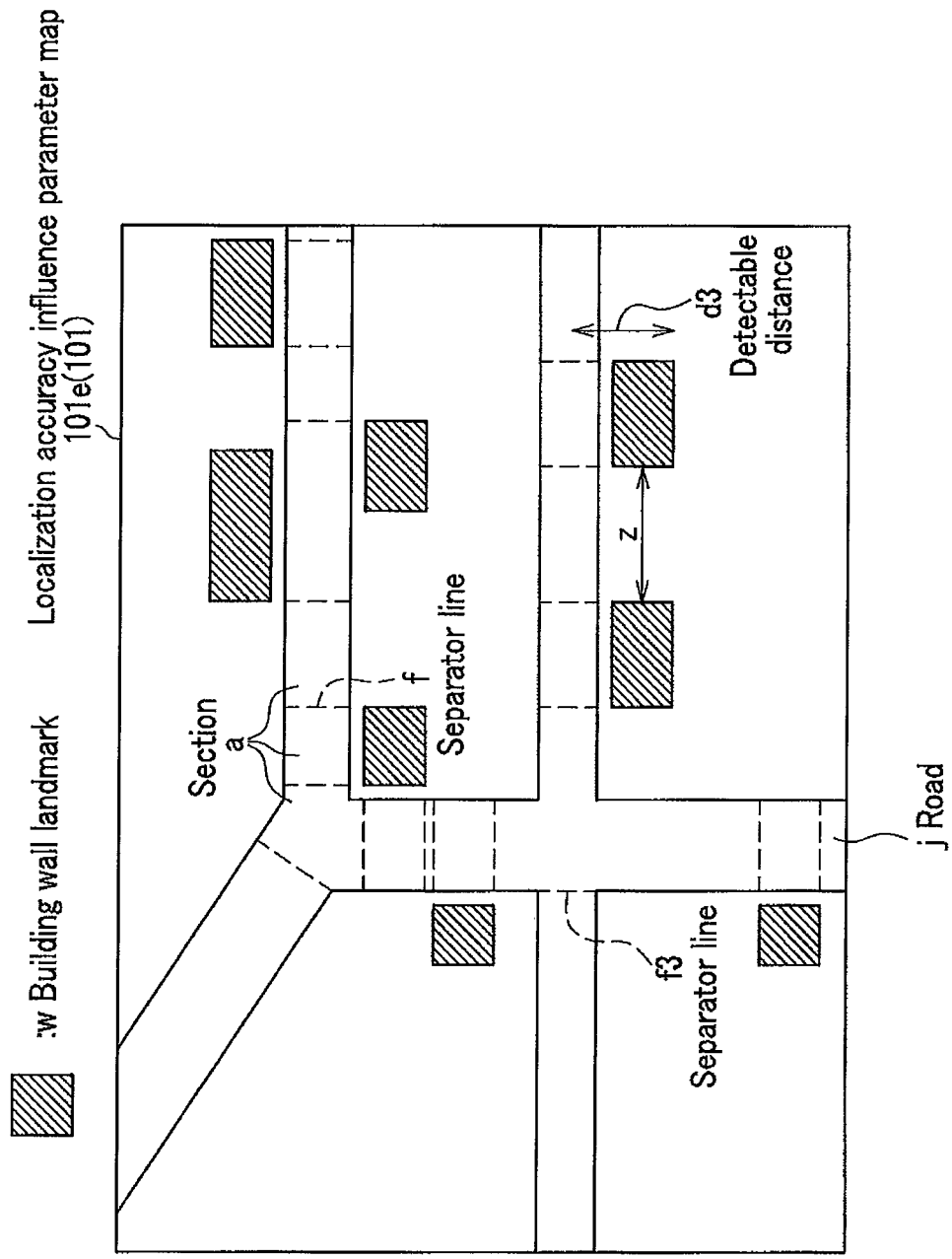
FIG. 13 is a diagram illustrating a localization accuracy influence parameter map having a data format in which a localization accuracy influence parameter using building wall landmarks is stored according to the embodiment.

Similarly, FIG. 13 illustrates a localization accuracy influence parameter map 101e (101) having a data format in which the building wall landmark interval distance z is stored as the localization accuracy influence parameter corresponding to building wall landmarks w (which may also be referred to as a yet another third data format). The localization accuracy influence parameter map 101e which stores therein the building wall landmark interval distance z has a data format in which, as described above, a data format in which a section a is created between two positions at each of which a building wall landmark w is present. A section a is created only if a distance between a building wall landmark w and the road j is within the detectable distance d3. A separator line f of the section a is assumed to be perpendicular from each position of the both ends of the building wall landmark w to the road. Each section a stores therein the landmark interval distance z which is measured based on the positions of the both ends of a building wall. Note that, if a section a is positioned just alongside a building, the section stores therein the building wall landmark interval distance z of a value "0". If there is no building wall landmark w between one intersection and the next on the road j, the road j is partitioned at the intersections. See, for example, a separator line f3. Such a portion partitioned at intersections by separator lines does not have a building wall landmark w, and the portion thus stores therein the building wall landmark interval distance z of a value "−1" as an exceptional case. Note that the value is not limited to "−1". Any other value can be used as long as the value can be recognized as an exception value.

The data formats can be used independently for each localization method. That is, a localization accuracy influence parameter map 101 including different versions having different data formats can be prepared for each localization method.

Next is described in detail the mapping unit for localization accuracy influence parameter 2. The mapping unit for localization accuracy influence parameter 2 creates the localization accuracy influence parameter map 101 for each localization method which is to be stored in the storage unit of localization accuracy influence parameter map 7. The data formats of the localization accuracy influence parameter map 101 are aforementioned, and thus, if information on a target travel environment such as a three-dimensional shape, and, according to the necessity, information on the positions of trees, utility poles, or buildings within the target travel environment is known, the different versions of the localization accuracy influence parameter map 101 can be created by means of geometric computation. The information on the three-dimensional shape and position can be obtained by well-known techniques. The information can be obtained using a laser scanner or via a network connected to another computing machine, as proposed in, for example, Japanese Laid-Open Patent Applications, Publication Nos. 2002-31528, 2009-14643, and 2007-198760. Japanese Laid-Open Patent Application, Publication No. 2008-204458 discloses that the information on the three-dimensional shape and position can be obtained from an image, that is, a corresponding image string can be captured in the target travel environment. Note that such an image in the target travel environment can be obtained from an existing service on the Internet (for example, Google (registered trademark), Street View "http://www.google.co.jp/help/maps/streetview/"). Or, the image can be obtained via a network connected to another computing machine. Thus, the mapping unit for localization accuracy influence parameter 2 creates various versions of the localization accuracy influence parameter map 101 by obtaining the information and performing geometric computation of the information which is realized as software on a computing machine.

Next is described each localization accuracy database 102 which is created by the creating unit for localization accuracy database 3 and is stored in the storage unit of localization accuracy database 9.

A localization accuracy database 102 is a database showing a relation between each localization accuracy influence parameter and a localization accuracy obtained by using a localization method. More specifically, the localization accuracy database 102 is a collection of data (in this case, relations) on how accurate a localization method can perform localization if a localization accuracy influence parameter at a given place takes a given value. Note that a localization accuracy database 102 is created for each localization method. For example, if the localization method used is GPS, the localization accuracy database 102 shows a relation between the canopy openness s as the localization accuracy influence parameter and its location accuracy; if tree landmarks, a relation between the tree landmark interval distance x as the localization accuracy influence parameter and its localization accuracy; if utility pole landmarks, a relation between the utility pole landmark interval distance y as the localization accuracy influence parameter and its localization accuracy; and if building wall landmarks, a relation between the building wall landmark interval distance z as the localization accuracy influence parameter and its localization accuracy.

Figures 14, 15:
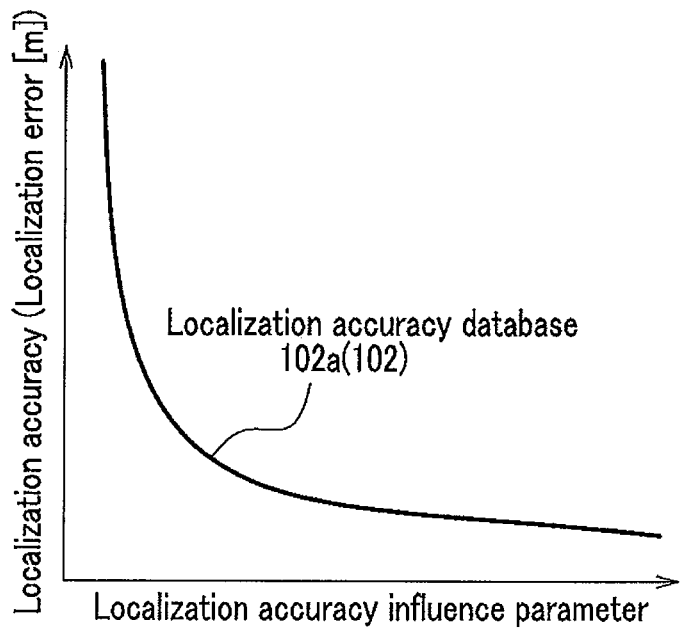
FIG. 14 is a diagram illustrating a data format of a localization accuracy influence parameter in which a relation between a localization accuracy influence parameter and a localization accuracy is stored according to the embodiment.
FIG. 15 is a diagram illustrating another data format of a localization accuracy influence parameter in which a relation between a localization accuracy influence parameter and a localization accuracy is stored according to the embodiment.

Next are described in detail data formats of the localization accuracy databases 102 with reference to FIG. 14 and FIG. 15. There are at least two data formats. As shown in FIG. 14, the localization accuracy database 102 in one data format stores therein a relation between each localization accuracy influence parameter and its localization accuracy using a corresponding localization method, as a function localization accuracy database 102a (102) (a first relational format). The creating unit for localization accuracy database 3 creates the function localization accuracy database 102a based on actual data (to be explained in detail hereinafter with reference to FIG. 17). As shown in FIG. 15, the localization accuracy database 102 in another data format stores therein the relation between each localization accuracy influence parameter and its localization accuracy using a corresponding localization method, as a look-up table localization accuracy database 102b (102) (a second relational format). Also in this data format, the creating unit for localization accuracy database 3 creates the look-up table localization accuracy database 102b based on actual data. The creating unit for localization accuracy database 3 and the storage unit of localization accuracy database 9 create and store therein the localization accuracy database 102 in either one of the above data formats 102a, 102b. Note that the data formats of the localization accuracy database 102 for all localization methods are not required to be the same, and any one of the data formats can be used for each localization method.

Next is described correspondence information between each localization method and a corresponding localization accuracy influence parameter which is stored in the storage unit of correspondences between localization method and localization accuracy influence parameter 6, with reference to FIG. 16.

The correspondence information between each localization method and the corresponding localization accuracy influence parameter used herein is a correspondence relation representing which localization accuracy influence parameter influences which localization method, and a relational expression between a localization accuracy influence parameter and a localization accuracy. The storage unit of correspondences between localization method and localization accuracy influence parameter 6 stores the above-mentioned information in a correspondence information table 103 shown in FIG. 16. The correspondence information table 103 shows the correspondence information and has fields of "landmark used", "sensing method", "localization accuracy influence parameter", and "localization accuracy influence parameter-localization accuracy relational expression". Note that the correspondence information needs to include at least the landmark used (a localization method) and the localization accuracy influence parameter.

Next is described each localization method in detail in terms of a combination of the landmark used and the sensing method. For example, the aforementioned localization method using GPS uses GPS satellites as landmarks. However, as disclosed in "Global Positioning System: Theory and Practice (B Hofmann-Wellenhof, H Lichtenegger, J Collins, published by Springer, ISBN: 3-211-83534-2)", GPS is performed with "point positioning" in some cases and with "differential positioning" in others. The localization method using GPS is thus divided into two differently-expressed methods, namely, the method with GPS point positioning and that with GPS differential positioning. A localization method using the tree landmark t is also divided into differently-expressed methods according to whether a laser scanner or a stereo camera senses the tree landmark t. Herein, the sensing method can be performed with not only a laser scanner and a stereo camera but also a monocular camera and the like. As shown in the correspondence information table 103 of FIG. 16, the other localization methods are also described differently according to the combination of the landmark used and the sensing method.

The storage unit of correspondences between localization method and localization accuracy influence parameter 6 stores therein an item of a localization accuracy influence parameter which influences its localization accuracy for each of the above-expressed localization methods, as a corresponding localization accuracy influence parameter.

Even if the same landmark is used, a localization accuracy is influenced according to different landmark position detection accuracies for each sensing method. It is therefore desirable that the localization accuracy influence parameter-localization accuracy relational expression which is used when a localization accuracy stored in the localization accuracy database 102 using a localization accuracy influence parameter is referenced is different for each sensing method. Thus, the storage unit of correspondences between localization method and localization accuracy influence parameter 6 stores therein a localization accuracy influence parameter-localization accuracy relational expression (a compensation expression) for each sensing method.

One specific example of the localization accuracy influence parameter-localization accuracy relational expression is as follows. Assume a case in which it is known (or has already been investigated) that a positional error of the differential positioning is 0.7 times a point positioning of GPS which is used as a reference by the localization accuracy database 102.

If a point positioning is performed, a localization accuracy (database error: localization error) stored in the localization accuracy database 102 is referenced as it is. If a differential positioning is performed, a localization accuracy stored in the localization accuracy database 102 is multiplied by 0.7 and is then referenced (compensated). Another example of the relational expression is as follows. Assume a case in which it is known that a landmark position detection accuracy by means of a stereo camera is lower by 0.5 meters than a laser scanner which is used as a reference by the localization accuracy database 102. If the laser scanner is used, a position stored in the localization accuracy database 102 is referenced as it is. If the stereo camera is used, a localization accuracy stored in the localization accuracy database 102 is lowered by 0.5 meters (an error range is extended by 0.5 meters) and is then referenced.

Figure 17:
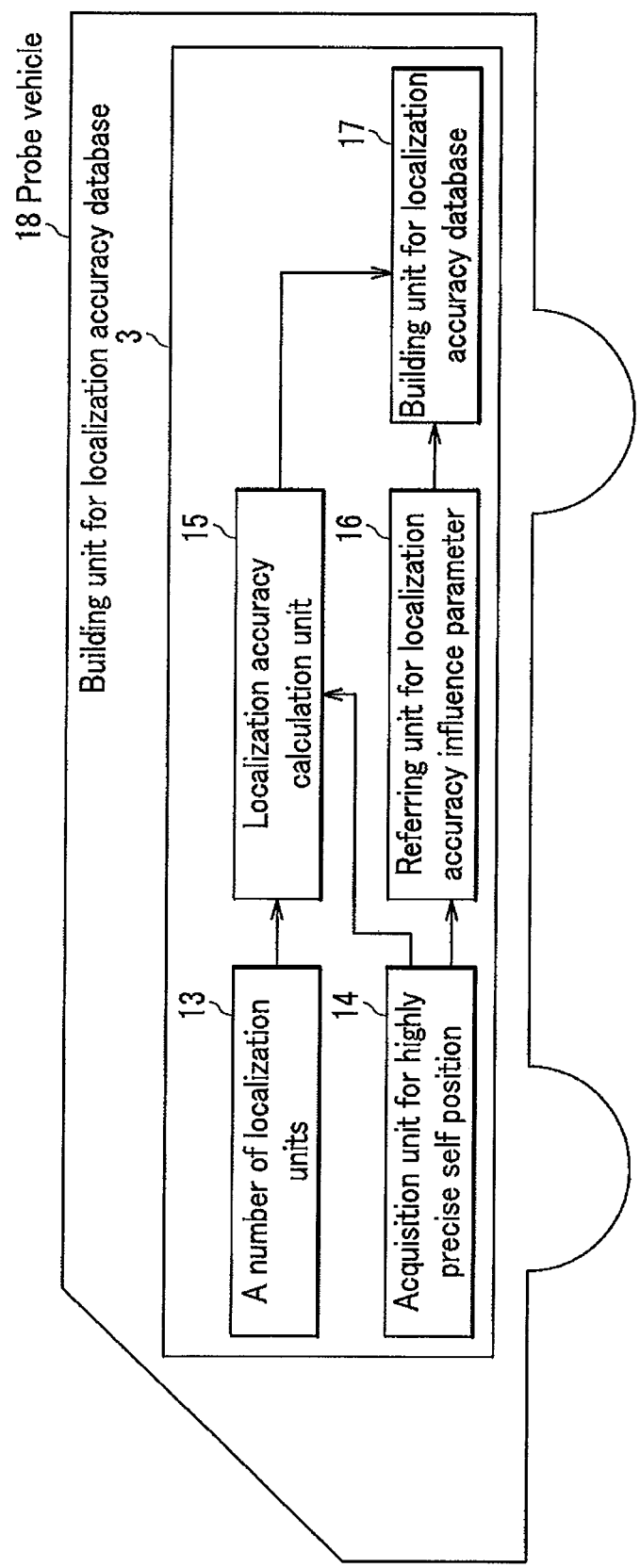
FIG. 17 is a block diagram illustrating details of a creating unit for localization accuracy database and a configuration of a probe vehicle on which the creating unit for localization accuracy database is mounted according to the embodiment.

Next is described in detail the creating unit for localization accuracy database 3 with reference to FIG. 17. The creating unit for localization accuracy database 3 includes a number of localization units 13, an acquisition unit for highly precise self position (which may also be referred to as a position sensor) 14, a localization accuracy calculation unit 15, a referring unit for localization accuracy influence parameter 16, and a building unit for localization accuracy database 17. When used, the creating unit for localization accuracy database 3 is mounted on a probe vehicle 18. In other words, a computer which performs information processing for realizing respective functions of the number of localization units 13, acquisition unit for highly precise self position 14, localization accuracy calculation unit 15, referring unit for localization accuracy influence parameter 16, and building unit for localization accuracy database 17 is mounted on the probe vehicle 18. The computer constitutes a part of the determining system for localization methods combination 1.

The number of localization units 13 each perform a localization, for which a localization accuracy database 102 is created. More specifically, the number of localization units 13 use the above-described GPS, tree landmarks, utility pole landmarks, building wall landmarks, and the like. The number of the localization methods used for creating a localization accuracy database 102 is as much as the number of the localization methods constituting the number of localization units 13. Typically, a plurality of localization methods are used as the number of localization units 13. However, a single localization method may be used as the number of localization units 13.

The acquisition unit for highly precise self position 14 acquires a self position of the probe vehicle 18 on which the creating unit for localization accuracy database 3 is mounted with a high accuracy in which a positional error is within a few centimeters (an accuracy sufficient to calculate a localization accuracy of a localization performed by the number of localization units 13). For example, RTK (Real Time Kinematic)-GPS is used as the acquisition unit for highly precise self position 14.

The localization accuracy calculation unit 15 takes the self position acquired by the acquisition unit for highly precise self position 14 as a true value, to thereby calculate an error of a self position acquired by the number of localization units 13, that is, a localization accuracy.

The referring unit for localization accuracy influence parameter 16 has a configuration the same as that of the above-described acquisition unit for localization accuracy influence parameter 8 and acquires a value of a localization accuracy influence parameter corresponding to the number of localization units 13. When a self position is inputted from the acquisition unit for highly precise self position 14, the referring unit for localization accuracy influence parameter 16 acquires a localization accuracy influence parameter at the self position.

The building unit for localization accuracy database 17 combines the localization accuracy calculated by the localization accuracy calculation unit 15 with the localization accuracy influence parameter acquired by the referring unit for localization accuracy influence parameter 16, to thereby create the localization accuracy database 102. Note that the data formats of the localization accuracy databases 102 are as mentioned above, and different versions thereof are created for each localization method. Herein, each localization accuracy database 102 is differently created according to a corresponding data format. A function localization accuracy database 102*a* is created by calculating a function of a localization accuracy and a localization accuracy influence parameter using function fitting realized as software on a computing machine, or a localization accuracy database look-up table 102*b* of the localization accuracy and the localization accuracy influence parameter is created.

Thus, if the probe vehicle 18 with the creating unit for localization accuracy database 3 mounted thereon travels in an environment, the creating unit for localization accuracy database 3 can create each localization accuracy database 102.

It is highly important to note that the probe vehicle 18 does not necessarily run in a location the same as that inputted from the target travel environment input unit 4. This means that the probe vehicle 18 can of course run in the same target travel environment, to thereby create the localization accuracy databases 102. It is also totally acceptable that the probe vehicle 18 runs in a location different from the target travel environment, to thereby create the localization accuracy databases 102. An intuitive explanation for the above-mentioned is that, because the determining system for localization methods combination 1 can represent an environment in an abstract form using a localization accuracy influence parameter, a localization accuracy in a target travel environment is predictable using localization accuracy data of an environment having a localization accuracy with characteristics similar to that of the target travel environment. Therefore, once the localization accuracy databases 102 are created covering an entire area in which a target localization accuracy influence parameter exists, the localization accuracy databases 102 do not require revision any more and can be used for another new target travel environment. Thus, the use of the determining system for localization methods combination 1 makes it possible to determine a suitable combination of localization methods in the target travel environment within the area, while saving time and cost. This is because there is no need of creating the localization accuracy databases 102 for each of users whose target travel environments are likely to be different from one another.

<Processing>

Next are described steps of a processing for using the determining system for localization methods combination 1. The steps are divided into two phases, that is, a preliminary phase and an operational phase. The steps in respective phases of the processing are thus described separately.

Figure 18:
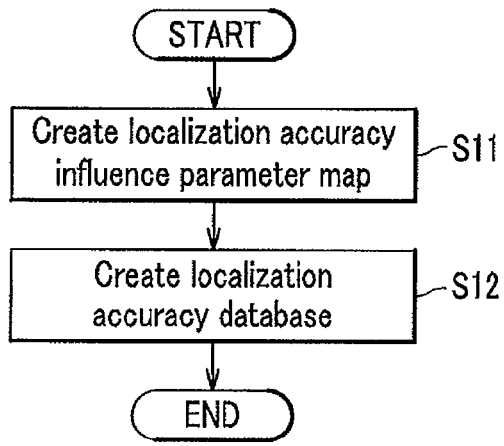
FIG. 18 is a flowchart illustrating processing steps in a preliminary phase in the determining system of a combination of a plurality of localization methods according to the embodiment.

Next are described steps in the preliminary phase in the determining system for localization methods combination 1 with reference to a flowchart of FIG. 18.

In step S11, the localization accuracy influence parameter map 101 is created. The mapping unit for localization accuracy influence parameter 2 creates the localization accuracy influence parameter map 101 and stores the created map 101 in the storage unit of localization accuracy influence parameter map 7. The data formats of the localization accuracy influence parameter map 101 and how to create the data formats are as described above. Herein, from among the correspondence information between the localization method and the localization accuracy influence parameter, the mapping unit for localization accuracy influence parameter 2 stores a localization method and a correspondence relation of a localization accuracy influence parameter, that is, items of "landmark used" and "localization accuracy influence parameter" (see FIG. 16), in the storage unit of correspondences between localization method and localization accuracy influence parameter 6.

In step S12, the localization accuracy database 102 is created. The creating unit for localization accuracy database 3 creates the localization accuracy database 102 and stores the created database 102 in the storage unit of localization accuracy database 9. The data formats of the localization accuracy database 102 and how to create the data formats are described above. Herein, from among the correspondence information between the localization method and the localization accuracy influence parameter, the creating unit for localization accuracy database 3 stores a localization accuracy influence parameter and a relational expression of a localization accuracy, that is, items of "localization accuracy influence parameter" and "localization accuracy influence parameter-localization accuracy relational expression" (see FIG. 16), in the storage unit of correspondences between localization method and localization accuracy influence parameter 6. Note that, with the storage of the "localization accuracy influence parameter-localization accuracy relational expression", the "sensing method" is also stored.

The above-mentioned steps constitute the preliminary phase of the determining system for localization methods combination 1. It is only necessary to perform the steps in the preliminary phase at least once, at the time of developing the determining system for localization methods combination 1. However, if a new localization method is added, an area of the localization accuracy influence parameter map 101 is extended, or the localization accuracy database 102 is expanded, the steps as described above are to be performed.

Figure 19:
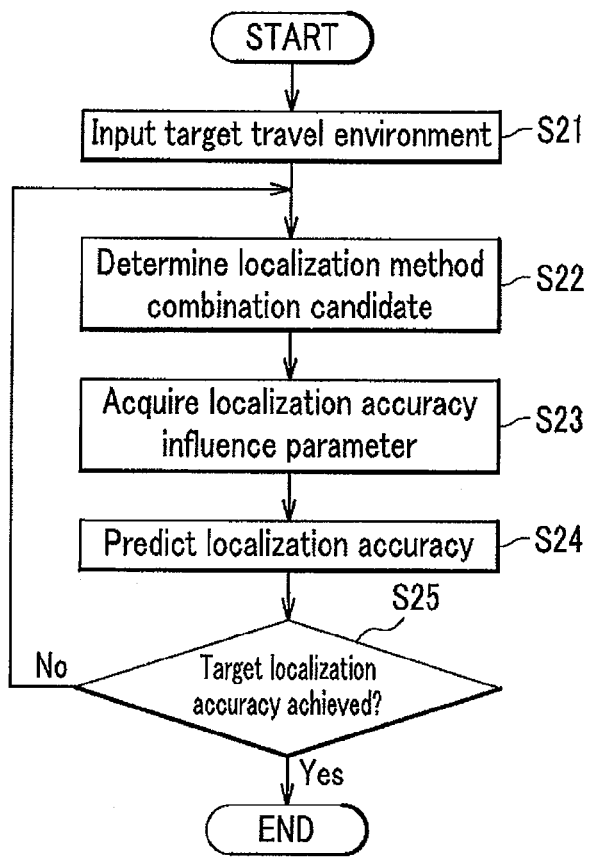
FIG. 19 is a flowchart illustrating processing steps in an operational phase in the determining system of a combination of a plurality of localization methods according to the embodiment.

Next are described steps in the operational phase in the determining system for localization methods combination 1, with reference to FIG. 19.

In S21, a user inputs data on a target travel environment. The input of the target travel environment is performed via the above-described target travel environment input unit 4.

In S22, a combination candidate of localization methods is determined. The user selects a desired localization method combination candidate from among a plurality of localization method combination candidates proposed by the above-described presentation unit for candidates of localization methods combination 5, by which the localization method combination candidate is determined. The determination may include a determination of a candidate of the sensing method.

In S23, a localization accuracy influence parameter corresponding to each localization method of the localization method combination candidate is acquired. The above-described acquisition unit for localization accuracy influence parameter 8 acquires an item of a localization accuracy influence parameter corresponding to each localization method, from the storage unit of correspondences between localization method and localization accuracy influence parameter 6. Using the item of the localization accuracy influence parameter, the acquisition unit for localization accuracy influence parameter 8 then acquires a value of the localization accuracy influence parameter in the target travel environment inputted from the target travel environment input unit 4, from the storage unit of localization accuracy influence parameter map 7. Thus, the acquisition unit for localization accuracy influence parameter 8 acquires the value of the localization accuracy influence parameter at each position in the target travel environment.

In S24, a localization accuracy of the localization method combination candidate is predicted. The above-described prediction unit for localization accuracy 10 predicts a localization accuracy for each localization method of the localization method combination candidate. The prediction unit for localization accuracy 10 acquires a relational expression between a localization accuracy influence parameter and a localization accuracy from the storage unit of correspondences between localization method and localization accuracy influence parameter 6; references the localization accuracy database 102 stored in the storage unit of localization accuracy database 9, using the relational expression and the localization accuracy influence parameter inputted from the acquisition unit for localization accuracy influence parameter 8; and predicts a localization accuracy for each localization method. For example, if the relational expression is "database error×0.7", the prediction unit for localization accuracy 10 references the localization accuracy database 102 to acquire a localization accuracy corresponding to the value of the localization accuracy influence parameter and predicts each localization accuracy by calculating a predicted value as a product of the localization error by 0.7 (with compensation). Thus, the prediction unit for localization accuracy 10 predicts as many localization accuracies at respective positions in the target travel environment as the number of localization methods included in the localization method combination candidate.

In S25, the predicted values of the localization accuracies for the localization method combination candidate are evaluated, that is, whether or not the predicted values of the localization accuracies at respective positions in the target travel environment achieve a target accuracy, for each localization method included in the localization method combination candidate. The target accuracy is entered by the user via the above-described target accuracy input unit 11. Whether or not the target accuracy is achieved is evaluated by the above-described evaluation unit for predicted localization accuracy 12 by comparing the predicted values of the localization accuracies for each localization method included in the localization method combination candidate with the target accuracy. The evaluation unit for predicted localization accuracy 12 evaluates such that, if any one of the localization methods included in the localization method combination candidate at each position in the target travel environment achieves the target accuracy (that is, if any one of the localization accuracy predicted values is not less than the target accuracy), the localization method combination candidate achieves the target accuracy in the entire target travel environment (that is, the localization method combination candidate has a localization accuracy not less than the target accuracy for all of the localization accuracy predicted values). The evaluation is based on a technique in which, in a combination of plural localization methods, probabilistic methods such as a Kalman filter and a particle filter make it possible to predict the most probable self position. The technique of predicting a self position using the probabilistic methods such as the Kalman filter and the particle filter is well-known and is disclosed in the above-described related art documents.

If it is determined in S25 that the localization method combination candidate achieves the target accuracy with respect to the entire target travel environment (If Yes in S25), the localization method combination candidate is determined as a definite localization method combination. On the other hand, if it is not determined in S25 that the localization method combination candidate achieves the target accuracy (If No in S25), the processing returns to S22 and repeats the same steps for another localization method combination candidate.

As described above, the determining system for localization methods combination 1 in this embodiment can determine a combination of localization methods which can achieve a target accuracy in a target travel environment at low cost without need of conducting a test using actual equipment which takes much time and cost. The use of the determining system for localization methods combination 1 has thus an excellent advantageous effect of realizing a vehicle, such as an autonomous mobile vehicle or a logistics support robot, on which a combination of localization methods suitable for a target travel environment is mounted.

<Variation>

Next is described a determining system for localization methods combination 1a (1) in which a localization accuracy influence parameter is not used, as a variation of the determining system for localization methods combination 1. The determining system for localization methods combination 1a without using a localization accuracy influence parameter has a simpler configuration than the determining system for localization methods combination 1. However, the determining system for localization methods combination 1a is effective in that time and cost required is shorter and lower than the system 1, in conducting the steps in the operational phase to determine a combination of localization methods which can achieve target accuracy. The determining system for localization methods combination 1a can thus determine a combination of localization methods which can achieve target accuracy at a lower cost than that of the related art.

Figure 20:
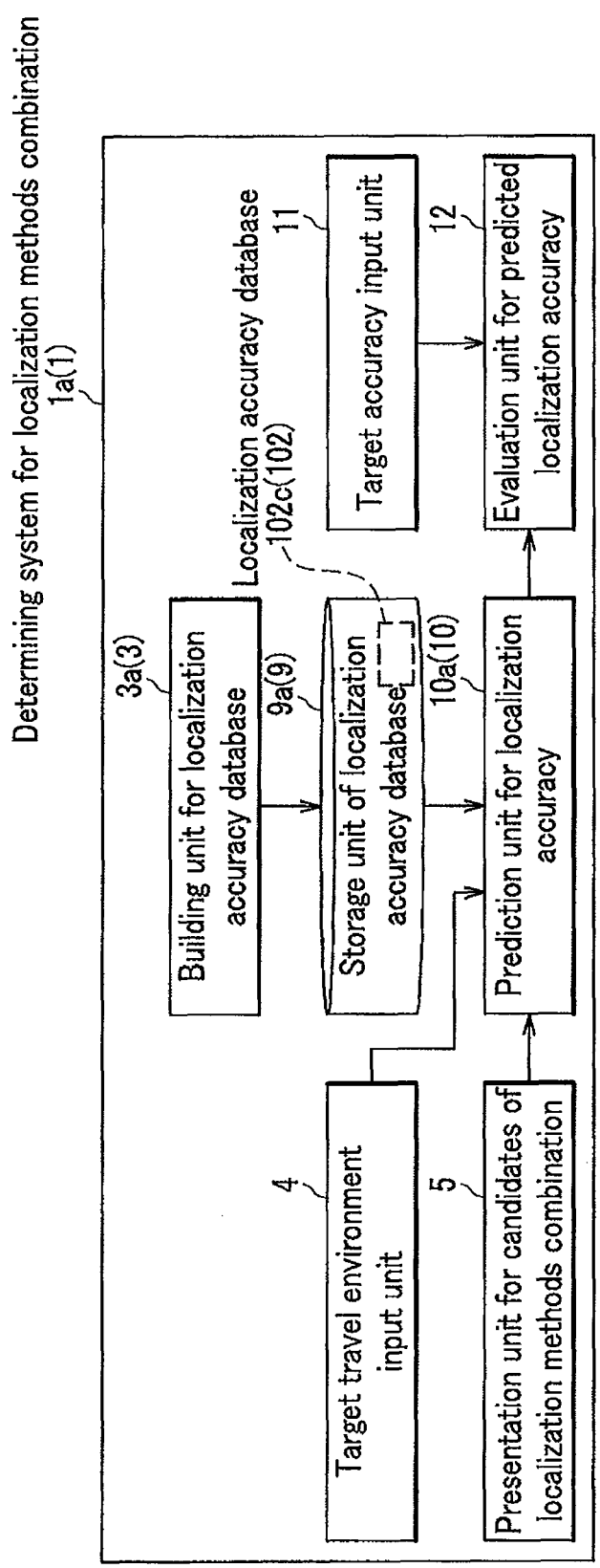
FIG. 20 is a block diagram illustrating a configuration of a determining system of a combination of a plurality of localization methods according to a variation of the embodiment.

Next is described a configuration of the determining system for localization methods combination 1a without using a localization accuracy influence parameter, with reference to FIG. 20.

The determining system for localization methods combination 1a includes a creating unit for localization accuracy database 3a (3), the target travel environment input unit 4, the presentation unit for candidates of localization methods combination 5, a storage unit of localization accuracy database 9a (9), a prediction unit for localization accuracy 10a (10), the target accuracy input unit 11, and the evaluation unit for predicted localization accuracy 12.

The target travel environment input unit 4, presentation unit for candidates of localization methods combination 5, target accuracy input unit 11, and evaluation unit for predicted localization accuracy 12 are the same as those in the determining system for localization methods combination 1, and description thereof is omitted herefrom.

The creating unit for localization accuracy database 3a, storage unit of localization accuracy database 9a, and prediction unit for localization accuracy 10a are modified (are changed in design while at least functions thereof are kept unchanged) from the creating unit for localization accuracy database 3, storage unit of localization accuracy database 9, and prediction unit for localization accuracy 10, respectively, of the determining system for localization methods combination 1.

Next are described the above-mentioned modified components.

The creating unit for localization accuracy database 3a is modified from the creating unit for localization accuracy database 3 as described above and creates a localization accuracy database 102c (102) stored in the storage unit of localization accuracy database 9a. Note that the localization accuracy database 102c has a function equivalent to that of the localization accuracy database 102. A data format of the creating unit for localization accuracy database 3a is, however, different from that of the localization accuracy database 102 created by the creating unit for localization accuracy database 3 in that (not a localization accuracy influence parameter but) a localization accuracy of each localization method at each position is stored therein.

The storage unit of localization accuracy database 9a is modified from the storage unit of localization accuracy database 9 as described above and stores therein the localization accuracy database 102c in which a localization accuracy of each localization method at each position created by the creating unit for localization accuracy database 3a is stored.

The prediction unit for localization accuracy 10a is modified from the prediction unit for localization accuracy 10 as described above and predicts a localization accuracy (at each position) in a target travel environment inputted from the target travel environment input unit 4, for each localization method in a localization method combination candidate inputted from the presentation unit for candidates of localization methods combination 5, by referencing the localization accuracy database 102c stored in the storage unit of localization accuracy database 9a.

Next is described the localization accuracy database 102c created by the creating unit for localization accuracy database 3a and stored in the storage unit of localization accuracy database 9a.

The localization accuracy database 102c stores therein a localization accuracy for each localization method at each position in the target travel environment. That is, the localization accuracy database 102c stores therein a collection of data representing how accurately a localization method can perform a localization. Note that the localization accuracy database 102c includes different versions according to each localization method.

Next is described a data format of the localization accuracy database 102c. The localization accuracy database 102c is represented as a map, at each position on which a localization accuracy of each localization method is stored. The map is partitioned similarly to the localization accuracy influence parameter map 101a or the localization accuracy influence parameter map 101b as shown in FIG. 9 and FIG. 10, respectively. However, information stored in the localization accuracy database 102c is not a localization accuracy influence parameter but a localization accuracy for each localization method. That is, the map of the localization accuracy database 102c has the data format in which the target travel environment is gridded with the grid g or in which a road in the target travel environment is partitioned with the section a and stores therein a localization accuracy of a localization method in each grid g or each section a.

Figure 21:
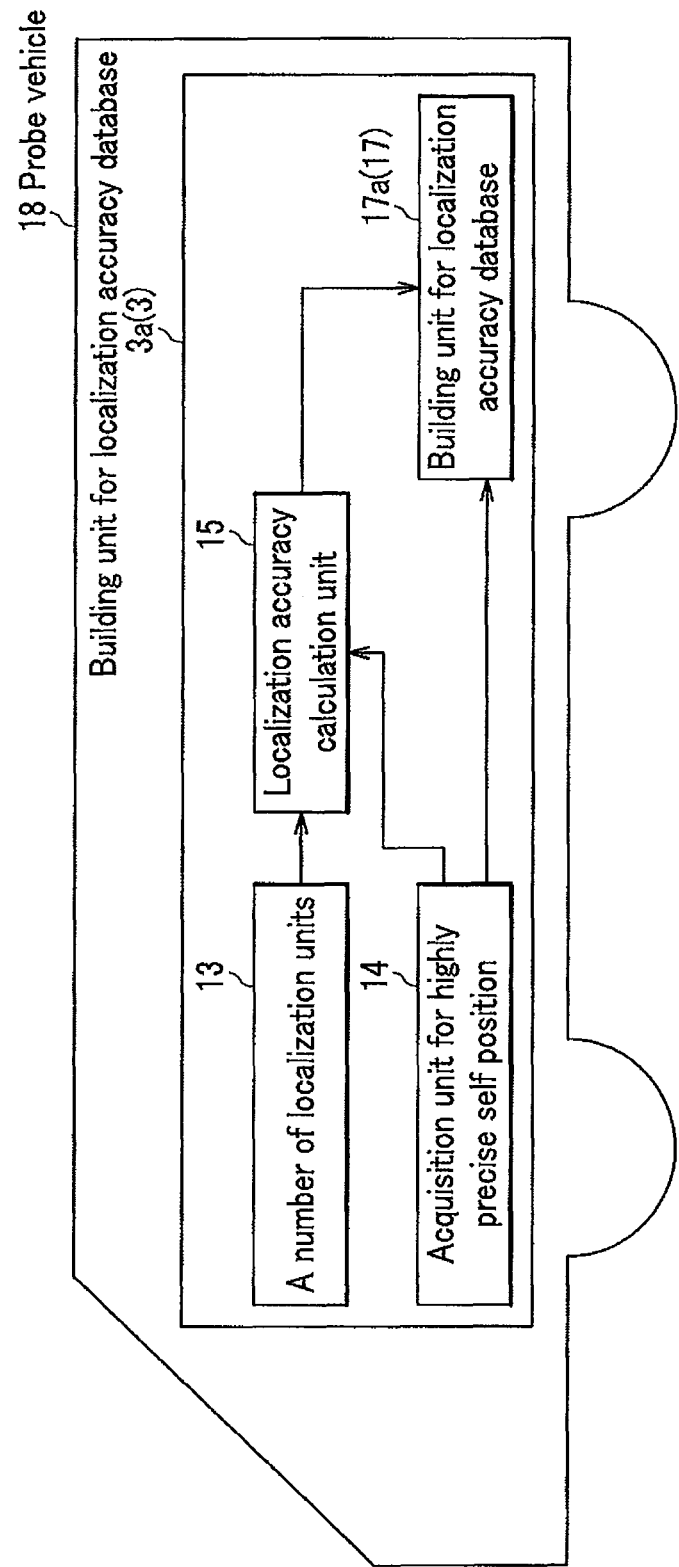
FIG. 21 is a block diagram illustrating details of a creating unit for localization accuracy database and a configuration of a probe vehicle on which the creating unit for localization accuracy database is mounted according to the variation.

Next is described in detail the creating unit for localization accuracy database 3a, with reference to FIG. 21. The creating unit for localization accuracy database 3a is modified from the creating unit for localization accuracy database 3 as described above. The creating unit for localization accuracy database 3a includes the number of localization units 13, the acquisition unit for highly precise self position 14, the localization accuracy calculation unit 15, and a building unit for localization accuracy database 17a (17). When used, the creating unit for localization accuracy database 3a is mounted on the probe vehicle 18.

The above-described components other than the building unit for localization accuracy database 17a are the same as those in the creating unit for localization accuracy database 3, and description thereof is omitted herefrom. The building unit for localization accuracy database 17a is modified from the above-described building unit for localization accuracy database 17 of the creating unit for localization accuracy database 3.

The building unit for localization accuracy database 17a stores therein a localization accuracy calculated by the localization accuracy calculation unit 15, with respect to a self position acquired by the acquisition unit for highly precise self position 14, to thereby create the localization accuracy database 102c. Note that the data formats of the localization accuracy database 102c are as mentioned above, and different versions thereof are created according to each localization method.

Thus, if the probe vehicle 18 with the creating unit for localization accuracy database 3a mounted thereon drives in an environment, the creating unit for localization accuracy database 3a can create the localization accuracy databases 102c.

It is necessary that, if the creating unit for localization accuracy database 3a is used, the probe vehicle 18 runs in a location the same as the target travel environment inputted from the target travel environment input unit 4. This is because the determining system for localization methods combination 1a does not use a localization accuracy influence parameter, unlike the determining system for localization methods combination 1. That is, the localization accuracy databases 102c need to be created each time the target travel environment differs. This means that, in the determining system for localization methods combination 1a, a longer time and a higher cost is required in the preliminary phase of the processing in order to determine a suitable combination of localization methods in a target travel environment, compared to the determining system for localization methods combination 1. Nevertheless, the system 1a has a simpler configuration than that of the system 1, thus allowing time and cost at the operational phase to be reduced.

Next are described steps of a processing for using the determining system for localization methods combination 1a. The steps of the determining system for localization methods combination 1a are divided into two phases, a preliminary phase and an operational phase, similarly to those of the determining system for localization methods combination 1. The steps in respective phases of the processing are thus described separately.

Figure 22:
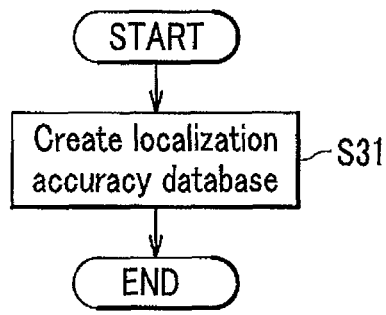
FIG. 22 is a flowchart illustrating a processing step in a preliminary phase in the determining system of a combination of a plurality of localization methods according to the variation.

Next is described a step in the preliminary phase in the determining system for localization methods combination 1a with reference to a flowchart of FIG. 22.

In S31, the localization accuracy database 102c is created. This is the only step in the preliminary phase. The creating unit for localization accuracy database 3a creates the localization accuracy database 102c and stores the created database 102c in the storage unit of localization accuracy database 9a. The data formats of the localization accuracy database 102c and how to create the data formats are as described above.

The above-mentioned step constitutes the preliminary phase of the determining system for localization methods combination 1a. It is only necessary for the step in the preliminary phase to be performed at least once, at the time of developing the determining system for localization methods combination 1a. However, the step as described above is to be performed each time the target travel environment changes.

Figure 23:
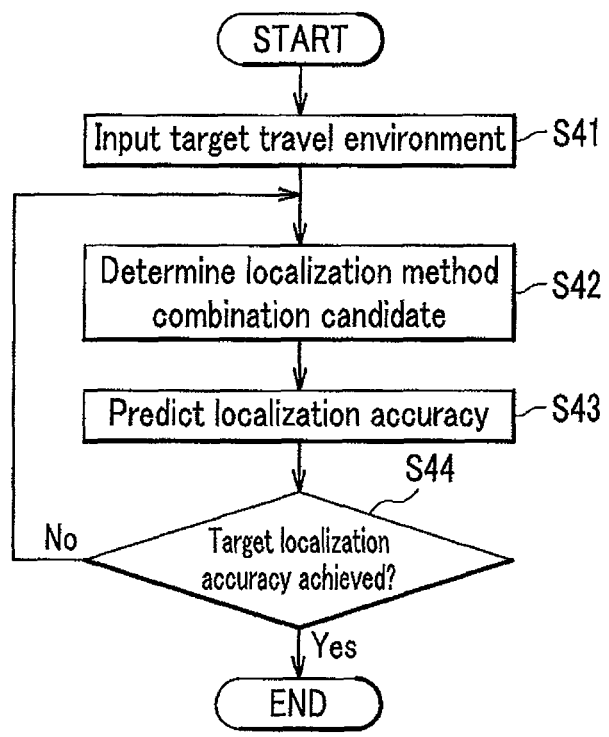
FIG. 23 is a flowchart illustrating processing steps in an operational phase in the determining system of a combination of a plurality of localization methods according to the variation.

Next are described steps in the operational phase in the determining system for localization methods combination 1a, with reference to FIG. 23.

In S41, a user inputs data on a target travel environment. The input of the target travel environment is performed via the above-described target travel environment input unit 4.

In S42, a combination candidate of localization methods is determined. The user selects a desired localization method combination candidate from among a plurality of localization method combination candidates proposed by the above-described presentation unit for candidates of localization methods combination 5, by which the localization method combination candidate is determined. The determination may include a determination of a candidate of the sensing method.

In S43, a localization accuracy of the localization method combination candidate is predicted. The above-described prediction unit for localization accuracy 10*a*: predicts a localization accuracy for each localization method of the localization method combination candidate; acquires a localization method combination candidate from the presentation unit for candidates of localization methods combination 5; also acquires a target travel environment from the target travel environment input unit 4; and references the localization accuracy database 102*c* stored in the storage unit of localization accuracy database 9*a* and corresponding to each localization method of the localization method combination candidate, to thereby obtain a value of a localization accuracy for each localization method in the target travel environment. Thus, the prediction unit for localization accuracy 10*a* predicts as many localization accuracies at each position in the target travel environment as the number of localization methods included in the localization method combination candidate.

In S44, the predicted values of the localization accuracies for the localization method combination candidate are evaluated, that is, whether or not the predicted values of the localization accuracies at respective positions in the target travel environment achieve a target accuracy, for each localization method included in the localization method combination candidate. The target accuracy is entered by the user via the above-described target accuracy input unit 11. Like in the determining system for localization methods combination 1, whether or not the target accuracy is achieved is evaluated by the above-described evaluation unit for predicted localization accuracy 12 by comparing the predicted values of the localization accuracies for each localization method included in the localization method combination candidate with the target accuracy. The evaluation unit for predicted localization accuracy 12 evaluates such that, if any one of the localization methods included in the localization method combination candidate at each position in the target travel environment achieves the target accuracy, the localization method combination candidate achieves the target accuracy in the entire target travel environment.

If it is determined in S44 that the localization method combination candidate achieves the target accuracy with respect to the entire target travel environment (If Yes in S44), the localization method combination candidate is determined as a definite localization method combination. On the other hand, if it is not determined in S44 that the localization method combination candidate achieves the target accuracy (If No in S44), the processing returns to S42 and repeats the same steps for another localization method combination candidate.

As described above, the determining system for localization methods combination 1*a* in this embodiment can determine a combination of localization methods which can achieve a target accuracy in a target travel environment at low cost without need of conducting a test using actual equipment which takes much time and cost. The system 1*a* can reduce cost in the operational phase, in particular. This means that, for example, if a target travel environment is so unique that there is no other similar travel environment, the use of a localization accuracy influence parameter has few advantages. Thus, the use of the determining system for localization methods combination 1*a* can save cost, compared to the determining system for localization methods combination 1.

The above-mentioned embodiment is exemplary in carrying out the present invention. However, the embodiment of the present invention is not limited to those explanations. Thus, those skilled in the art can make the various modifications and variations to the present invention to adapt it to various usages and conditions without changing the gist of the present invention.

In this embodiment, for example, the correspondence information is configured such that one localization accuracy influence parameter is used for one landmark (see FIG. 16). However, two or more localization accuracy influence parameters may be used for one landmark. Further, a different localization accuracy influence parameter than the one given may be used for each landmark.

In this embodiment, a localization accuracy influence parameter is constituted by landmarks of the same type, such as the tree landmark interval distance. However, one of such landmarks may be a tree and another may be a utility pole, for example, and an interval distance between the tree and the utility pole may be used as a localization accuracy influence parameter. That is, a localization accuracy influence parameter constituted by landmarks of different types may be used.

A localization accuracy influence parameter used in this embodiment basically has no influence on a travel environment. For example, if the localization accuracy influence parameter used is a tree landmark interval distance, it does not make any difference in where two trees as a basis for calculating the tree landmark interval distance are planted within a travel environment. However, a localization accuracy influence parameter which has an influence on a travel environment can also be used.

The embodiment according to the present invention has been explained as aforementioned. However, the embodiment of the present invention is not limited to those explanations, and those skilled in the art can ascertain the essential characteristics of the present invention and can make the various modifications and variations to the present invention including a specific configuration of hardware, software, a flowchart, and the like to adapt it to various usages and conditions without departing from the spirit and scope of the present invention.

The invention claimed is:

1. A determining system for localization methods combination which determines a suitable combination candidate of localization methods before a vehicle actually performs a localization, the determining system comprising:

a storage unit that stores:

correspondence information in which a landmark used by one of the localization methods and a localization accuracy influence parameter which influences a localization accuracy obtained when localization is performed using the respective one of the localization methods are made to correspond to each other, for each of the localization methods, a localization accuracy influence parameter map which is map data including a value of the localization accuracy influence parameter, and a localization accuracy database which shows a relation between the value of the localization accuracy influence parameter and the localization accuracy; and a control unit that:
acquires a travel environment of the vehicle and a proposed combination candidate including two or more localization methods, from an input unit,
identifies a localization accuracy influence parameter which is previously made to correspond to various landmarks at respective positions in the travel environment used by one of the localization methods of the proposed combination candidate, using the correspondence information, for each of the localization methods of the proposed combination candidate,
identifies a value of the identified localization accuracy influence parameter which is identified in the travel environment, using the localization accuracy influence parameter map, for each of the localization methods of the proposed combination candidate,
predicts, with reference to the localization accuracy database, a localization accuracy corresponding to the value of the identified localization accuracy influence parameter, for each of the localization methods of the proposed combination candidate in the respective positions in the travel environment, and
determines the proposed combination candidate as an actual combination of the localization methods for localization of the vehicle, if any one of the predicted localization accuracies at each of the respective positions in the travel environment is not less than a target accuracy inputted from the input unit.

2. The determining system for localization methods combination according to claim 1,
wherein the control unit computes, for each of the localization methods, a relation between the localization accuracy and the value of the localization accuracy influence parameter, using a position sensor which computes a self-position with a sufficient accuracy for calculating a localization accuracy of localization by the respective localization method, and creates a localization accuracy database in which the computed relation is stored.

3. The determining system for localization methods combination according to claim 1,
wherein the control unit further: acquires at least one of a three-dimensional shape and an image of the travel environment from another computing machine via a network; and creates the localization accuracy influence parameter map by means of geometric computation, based on at least one of the acquired three-dimensional shape and the acquired image.

4. The determining system for localization methods combination according to claim 1,
wherein the localization accuracy influence parameter map has any one of: a first data format having a grid with a prescribed size for partitioning the travel environment; a second data format having a section with a prescribed size for partitioning a road present in the travel environment; and a third data format having a section partitioned at a position of a landmark used by the localization method for partitioning a road present in the travel environment, where each localization method is associated with one of the first, second and third data formats, and includes a value of the localization accuracy influence parameter in the corresponding data format.

5. The determining system for localization methods combination according to claim 4,
wherein the size of the grid in the first data format and the size of the section in the second data format are each not more than 10 times the size of the vehicle.

6. The determining system for localization methods combination according to claim 1,
wherein the localization accuracy influence parameter is an interval distance between landmarks used by the localization method.

7. The determining system for localization methods combination according to claim 1,
wherein the localization accuracy database is stored either in a first relational format in which a relation between a value of the localization accuracy influence parameter and the localization accuracy is represented as a function or in a second relational format in which the relation is represented as a look-up table, and is created for each of the localization methods.

8. The determining system for localization methods combination according to claim 1,
wherein, if a localization method using a given landmark has two or more different sensing methods, the correspondence information further stores therein information based on a correspondence for each sensing method, and
wherein the control unit predicts, with reference to the localization accuracy database, a localization accuracy corresponding to the value of the identified localization accuracy influence parameter with a compensation based on the sensing method, for each of the localization methods of the combination candidate.

* * * * *